(12) United States Patent
Thankamani et al.

(10) Patent No.: US 12,506,528 B2
(45) Date of Patent: Dec. 23, 2025

(54) METHOD AND BASE STATION FOR ESTIMATING ANGLE OF ARRIVAL OF SIGNAL

(71) Applicant: Samsung Electronics Co., Ltd., Suwon-si (KR)

(72) Inventors: Rakesh Raghukumaran Nair Thankamani, Bangalore (IN); Kiran Bynam, Bangalore (IN); Basant Prasad, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 357 days.

(21) Appl. No.: 18/451,786

(22) Filed: Aug. 17, 2023

(65) Prior Publication Data

US 2024/0048211 A1 Feb. 8, 2024

Related U.S. Application Data

(63) Continuation of application No. PCT/KR2023/010873, filed on Jul. 26, 2023.

(30) Foreign Application Priority Data

Nov. 29, 2022 (IN) .............................. 202241068804

(51) Int. Cl.
  *H04B 7/06* (2006.01)
  *H04B 7/08* (2006.01)
(52) U.S. Cl.
  CPC ........... *H04B 7/0682* (2013.01); *H04B 7/086* (2013.01)

(58) Field of Classification Search
  CPC .............................. H04B 7/0682; H04B 7/086
  See application file for complete search history.

(56) References Cited

U.S. PATENT DOCUMENTS 10,091,616 B2  10/2018  Prevatt
10,557,919 B2  2/2020  Irvine et al.
(Continued)

FOREIGN PATENT DOCUMENTS

KR  10-2021-0030180 A  3/2021
KR  10-2022-0087428 A  6/2022
WO  WO 2018055482 A1  3/2018

OTHER PUBLICATIONS

3GPP TS 38.211 V17.5.0, 3rd Generation Partnership Project; Technical Specification Group Radio Access Network;, Jun. 2023, 136 pages, NR; Physical channels and modulation (Release 17), 136 pages.

(Continued)

*Primary Examiner* — Hashim S Bhatti
(74) *Attorney, Agent, or Firm* — Nixon & Vanderhye P.C.

(57) ABSTRACT

A system and/or method for determining an Angle of Arrival (AoA) of a signal by a base station. The technique may include configuring different time intervals and multiple phase shifts across an antenna array of the base station. The technique may include receiving the signal from UEs at the different time intervals and the multiple phase shifts across the antenna array. The technique may include estimating phase angles of the signal received at the different time intervals and the multiple phase shifts. The technique may include determining the AoA of the signal received from the UEs based on the phase angles of the signal received at the different time intervals and the multiple phase shifts.

16 Claims, 15 Drawing Sheets

(56) References Cited

U.S. PATENT DOCUMENTS

| | | | |
|---|---|---|---|
| 10,567,905 | B2 | 2/2020 | Edge et al. |
| 11,171,698 | B2 | 11/2021 | Chen et al. |
| 11,445,468 | B2 | 9/2022 | Yang et al. |
| 12,143,195 | B1 * | 11/2024 | Ismail ................ H04W 4/80 |
| 2017/0227623 | A1 | 8/2017 | Park et al. |
| 2019/0068259 | A1 | 2/2019 | Liu et al. |
| 2019/0166453 | A1 | 5/2019 | Edge et al. |
| 2022/0158702 | A1 * | 5/2022 | Nallampatti Ekambaram ............ H04B 7/086 |

OTHER PUBLICATIONS

3GPP TS 38.212 V17.5.0, 3rd Generation Partnership Project; Technical Specification Group Radio Access Network; NR;, Mar. 2023, Multiplexing and channel coding (Release 17), 203 pages.

3GPP TS 38.213 V17.6.0, 3rd Generation Partnership Project; Technical Specification Group Radio Access Network;, Jun. 2023, 262 pages, NR; Physical layer procedures for control (Release 17), 262 pages.

Li et al., Beam Management in Millimeter-Wave Communications for 5G and Beyond, Published Jan. 1, 2020, vol. 8, IEEE Access, 12 pages.

Stratidakis et al., A Low-Overhead Hierarchical Beam-tracking Algorithm for THz Wireless Systems, European Conference on Networks and Communications (EuCNC): Physical Layer and Fundamentals (PHY), May 4, 2020, 5 pages.

Zhai et al., THzPrism: Frequency-Based Beam Spreading for Terahertz Communication Systems, IEEE Wireless Communications Letters 9, 2020, No. 6, pp. 897-900.

PCT International Search Report dated Nov. 14, 2023 for PCT/KR2023/010873.

PCT Written Opinion dated Nov. 14, 2023 for PCT/KR2023/010873.

* cited by examiner

METHOD AND BASE STATION FOR ESTIMATING ANGLE OF ARRIVAL OF SIGNAL

RELATED APPLICATIONS

This application is a continuation application of international application No. PCT/KR2023/010873, filed on Jul. 26, 2023, which is based on and claims the benefit of IN patent application number 202241068804 filed on Nov. 29, 2022, the disclosures of each of which are hereby entirely incorporated by reference herein.

BACKGROUND

Field

Certain example embodiments relate to wireless communication, and for example to a method and/or a base station for estimating an Angle of Arrival (AoA) of a signal received from a User Equipment (UE).

Description of Related Art

Fifth Generation New Radio (5G NR) system employs directional beams for radio access to overcome severe pathloss of millimetre wave signal propagation. Due to power constraints and complexity, Full Dimensional (FD) arrays utilizing hybrid beamforming are generally adopted for a base station. FIG. 1A is a schematic diagram illustrating a hybrid beamforming-based antenna system. In the hybrid beamforming-based antenna system, each Radio Frequency (RF) chain generates one antenna beam at a time. Therefore, number of simultaneous antenna beams generated is limited by the RF chains available at the base station. To communicate with each User Equipment (UE) in downlink direction, the base station needs to identify appropriate antenna beams for each UE via channel measurements. In the 5G NR, the channel measurements are done for a few antenna beams at a time, which is a very time-consuming process since the base station with a limited number of simultaneously generated antenna beams has to examine a large number of directions (or Angle-of-Arrival (AoA)) of the antenna beams due to narrow beams employed to support sufficient link margin at the UE. Delays in identifying the antenna beams for data communication can degrade network performance in terms of Quality-of-Service (QoS). Moreover, a large number of channel measurements can also raise power consumption at the base station as well as the UE.

FIG. 1B is a schematic diagram illustrating a hierarchical beam search performing by the base station (10) for the UE (20). In the 5G NR system, initial beam acquisition is done with a wider antenna beam using Synchronization Signal Block (SSB) transmission from the base station (10) or using Channel State Information Reference Signal (CSI-RS). For downlink data transmission with higher throughput, the initial wider antenna beam is refined (e.g. narrowed) by sending the CSI-RS from the base station (10) to the UE (20). For beam refinement, the base station (10) sends the CSI-RS signals through one of a candidate transmit beams. Further, the UE (20) performs L1-Reference Signal Received Power (L1-RSRP) measurements for each transmit beam. Further, the UE (20) chooses one of the transmit beams based on the L1-RSRP measurements. With the conventional hierarchical beam searching of the 5G NR system, the complexity of the search mechanism is a function of a number of candidate beams at the base station (10) and the UE (20). For example, when M transmit beams and N receive beams are available, then the search complexity is proportional to M×N, which is significantly high for narrow beams required for 5G NR millimeter wave (5G NR mmWave) and Terahertz (THz) communication bands. Thus beam searching for downlink transmission with the UEs is significantly time consuming since the base station (10) has to examine a large number of beam directions due to the limited number of RF chains and the narrow beams employed to support sufficient link margin at UE As such, a new antenna beam searching mechanism is required to be developed with an objective to reduce the number of measurements compared to the conventional beam searching methods in the 5G NR system, and thereby reducing overall delay incurred due to the beam measurements. Additionally, it is desired to have minimum or relatively small changes in hardware design or protocol design to facilitate easier merging with current NR Frequency Range 2 (NR FR2) operation.

The above information is presented as background information only to assist with an understanding of the disclosure. No determination has been made, and no assertion is made, as to whether any of the above might be applicable as prior art with regard to the disclosure.

SUMMARY

Certain example embodiments herein provide a method and/or a base station for determining an AoA of a signal.

Certain example embodiments herein provide an antenna beam searching/refinement mechanism to reduce number of measurements compared to conventional beam searching methods in 5G NR systems, and for example for reducing overall delay incurred due to beam measurements. To enhance the beam searching capability, the base station may simultaneously estimate the AoA of the signals coming from UEs in different directions using a single RF chain, where the same method extends to muti-RF chain scenario as well. Thereby, the methods help to reduce an antenna beam search overhead for the hybrid beamforming architecture, and antenna beam searching time for the base station to identify appropriate narrow beams for data transmission with each UE.

Certain example embodiments herein reduce access delays for 5G NR mmWave and future THz cellular access systems which use narrow antenna beams using the proposed beam searching method, which may enhance cellular access mechanism and improve user experience.

Certain example embodiments herein provide a method for determining an Angle of Arrival (AoA) of a signal by a base station. The method may include configuring, by the base station, different time intervals and multiple phase shifts across an antenna array of the base station. The method may include receiving, by the base station, the signal from User Equipments (UEs) at the different time intervals and the multiple phase shifts across the antenna array. The method may include estimating, by the base station, phase angles of the signal received at the different time intervals and the multiple phase shifts. The method may include determining, by the base station, the AoA of the signal received from the UEs based on the phase angles of the signal received at the different time intervals and the multiple phase shifts.

In an example embodiment, receiving, by the base station, the signal from the UEs at the different time intervals and the multiple phase shifts across the antenna of the base station, may comprise: receiving, by the base station, the signal from the UEs at a first-time interval without applying unit shift across the antenna array; receiving, by the base station, the signal from the UEs at a second time interval by applying one unit shift across the antenna array; and receiving, by the base station, the signal from the UEs at a third time interval by applying two unit shift across the antenna array.

In an example embodiment, estimating, by the base station, the phase angles of the signal received at the different time intervals and the multiple phase shifts, may comprise: estimating, by the base station, a first phase angle in the phase angles of the signal during reception of the signal at the first time interval without applying unit shift across the antenna array; estimating, by the base station, a second phase angle in the phase angles of the signal during reception of the signal at the second time interval by applying the one unit shift across the antenna array; estimating, by the base station, a third phase angle in the phase angles of the signal during reception of the signal at the third time interval by applying the two unit shift across the antenna array.

In an example embodiment, determining, by the base station, the AoA of the signal received from the UEs based on the phase angles of the signal received at the different time intervals and the multiple phase shifts, may comprise: determining, by the base station, a difference between the phase angles of the signal received at the different time intervals and the multiple phase shifts; and estimating, by the base station, the AoA of the signal received from the UEs based on the difference between the phase angles.

In an example embodiment, where the base station may use a wider beam for receiving the signal from the UEs.

In an example embodiment, where further the method may comprise identifying, by the base station, a narrow beam overlapping on the estimated AoA for data communication with the UEs.

In an example embodiment, estimating, by the base station, the phase angles of the signal received at the different time intervals and the multiple phase shifts, may comprise: estimating, by the base station, a first total amplitude of signals received from multiple UEs without applying the unit shift across the antenna array; estimating, by the base station, a second total amplitude of signals received from the multiple UEs by applying the one unit shift across the antenna array; determining, by the base station, whether the first total amplitude is equal to the second total amplitude; and performing, by the base station, one of: estimating the phase angles of the signal received from each UE at the different time intervals and the multiple phase shifts, when the first total amplitude is equal to the second total amplitude, and determining the phase angles of the signal received from each UE at the different time intervals and the multiple phase shifts on the received signals, when the first total amplitude is unequal to the second total amplitude.

Certain example embodiments herein may provide a base station for determining the AoA of the signal. The base station may include an AoA estimating engine comprising processing circuitry, a memory, and a processor, where the AoA estimating engine may be coupled, directly or indirectly, to the memory and the processor. The AoA engine may, or may not be, part of the processor. The AoA estimating engine may be configured for configuring the different time intervals and the multiple phase shifts across the antenna array of the base station. The AoA estimating engine may be configured for receiving the signal from the UEs at the different time intervals and the multiple phase shifts across the antenna array. The AoA estimating engine may be configured for estimating the phase angles of the signal received at the different time intervals and the multiple phase shifts. The AoA estimating engine may be configured for determining the AoA of the signal received from the UEs based on the phase angles of the signal received at the different time intervals and the multiple phase shifts.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments, and the embodiments herein include all such modifications.

BRIEF DESCRIPTION OF FIGURES

Certain example embodiments are illustrated in the accompanying drawings, throughout which like reference letters indicate corresponding parts in the various figures. The example embodiments herein will be better understood from the following description with reference to the drawings, in which.

DETAILED DESCRIPTION

Figure 1A:
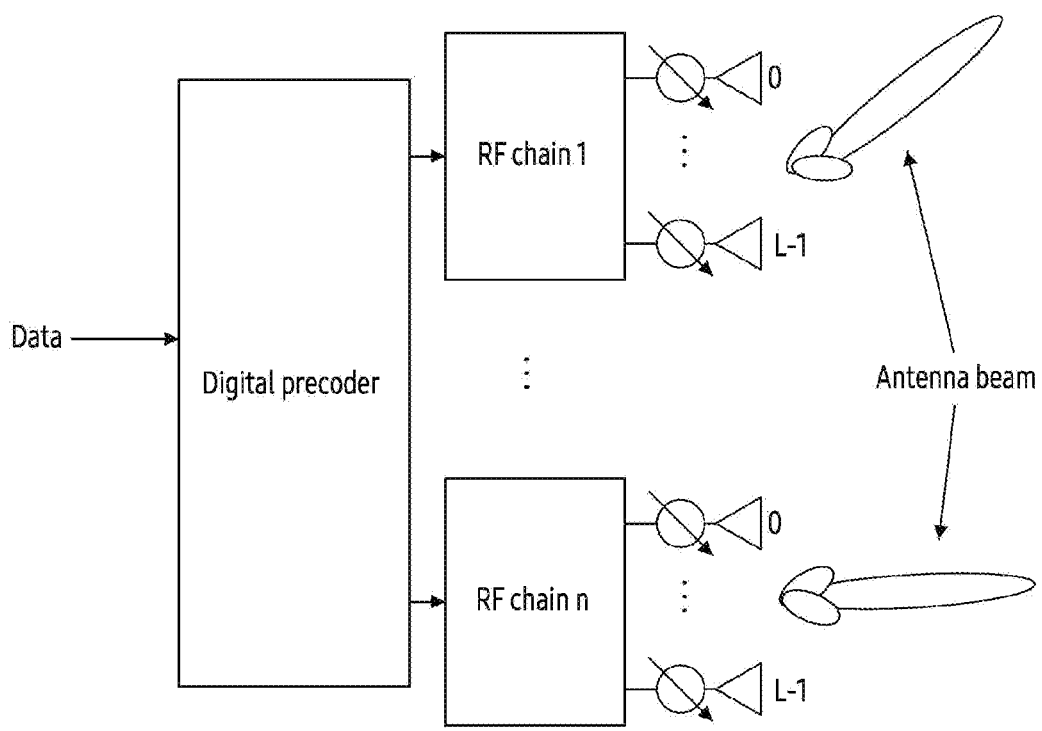
FIG. 1A is a schematic diagram illustrating a hybrid beamforming-based antenna system, according to a prior art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the disclosure. In addition, descriptions of well-known functions and constructions may be omitted for clarity and conciseness.

The terms and words used in the following description and claims are not be limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various examples of the disclosure described below, a hardware approach will be described as an example. However, since various embodiments of the disclosure may include a technology that utilizes both the hardware-based and the software-based approaches, they are not intended to exclude the software-based approach.

As used herein, the terms referring to merging (e.g., merging, grouping, combination, aggregation, joint, integration, unifying), the terms referring to signals (e.g., packet, message, signal, information, signaling), the terms referring to resources (e.g. section, symbol, slot, subframe, radio frame, subcarrier, resource element (RE), resource block (RB), bandwidth part (BWP), opportunity), the terms used to refer to any operation state (e.g., step, operation, procedure), the terms referring to data (e.g. packet, message, user stream, information, bit, symbol, codeword), the terms referring to a channel, the terms referring to a network entity (e.g., distributed unit (DU), radio unit (RU), central unit (CU), control plane (CU-CP), user plane (CU-UP), O-DU-open radio access network (O-RAN) DU), O-RU (O-RAN RU), O-CU (O-RAN CU), O-CU-UP (O-RAN CU-CP), O-CU-CP (O-RAN CU-CP)), the terms referring to the components of an apparatus or device, or the like are only illustrated for convenience of description in the disclosure. Therefore, the disclosure is not limited to those terms described below, and other terms having the same or equivalent technical meaning may be used therefor. Further, as used herein, the terms, such as '~module', '~unit', '~part', '~body', or the like may refer to at least one shape of structure or a unit for processing a certain function.

Further, throughout the disclosure, an expression, such as e.g., 'above' or 'below' may be used to determine whether a specific condition is satisfied or fulfilled, but it is merely of a description for expressing an example and is not intended to exclude the meaning of 'more than or equal to' or 'less than or equal to'. A condition described as 'more than or equal to' may be replaced with an expression, such as 'above', a condition described as 'less than or equal to' may be replaced with an expression, such as 'below', and a condition described as 'more than or equal to and below' may be replaced with 'above and less than or equal to', respectively. Furthermore, hereinafter, 'A' to 'B' means at least one of the elements from A (including A) to B (including B). Hereinafter, 'C' and/or 'D' means including at least one of 'C' or 'D', that is, {'C', 'D', or 'C' and 'D'}.

The disclosure describes various embodiments using terms used in some communication standards (e.g., 3rd Generation Partnership Project (3GPP), extensible radio access network (xRAN), open-radio access network (O-RAN) or the like), but it is only of an example for explanation, and the various embodiments of the disclosure may be easily modified even in other communication systems and applied thereto.

Certain example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "signal" and "pilot signal" are used interchangeably and mean the same, the terms "array" and "antenna array" are used interchangeably and mean the same.

Existing 5G NR systems utilize an antenna beam sweeping in time or frequency to identify appropriate antenna beams for a base station to communicate with each UE, which requires a significant amount of time or complex RF circuitry (along with the requirement of several GHz-wide bandwidths). The proposed method enables antenna beam searching with reduced time and RF circuit complexity. The base station simultaneously estimates a AoA of signals coming from the UE in different directions using a single RF chain. With the aid of phase rotation property of Fourier transform in spatial domain, the base station determines exact AoA of individual signals received from each UE even with much broader beams instead of switching to narrow beams as employed in the existing 5G NR systems. Once the exact AoA of the signal is determined, the base station identifies a corresponding narrow beam. As such, the proposed method causes to significantly reduce a time complexity and latency of beam search/misalignment management as compared to convention beam searching methods in the 5G NR systems. The proposed method allows the base station to reduce antenna beam searching delay is a promising alternative for the existing beam switching based antenna beam identification mechanism.

The base station identifies antenna beams for downlink data transfer with the UEs with a lesser number of measurements. The number of measurements for identifying the narrow beams for data transfer is reduced by performing measurements by the base station directly using the wider antenna beams instead of performing measurements using the narrow beams overlapping with the wider antenna beam. The base station conducts the antenna beam measurements for multiple UEs simultaneously unlike in conventional beam searching methods of the 5G NR system in which measurements for one UE is conducted at a time. The proposed method includes a novel 3-steps utilizing the wider antenna beams to estimate exact AoA of individual UE signals coming from different directions evaluated using phase rotation property of Fourier transform in spatial domain. Once the exact angle of arrival of a signal is determined, the corresponding narrow beam can be identified that overlaps with the AoA.

As such, time complexity of beam search/misalignment management can be significantly reduced as compared to the conventional beam searching methods of the 5G NR system. To enhance the search capability, the base station uses multiple wider beams simultaneously using the subsampling of an incoming wavefront, where antenna spacing>0.5*wavelength ($\lambda$). The proposed method can be implemented on the existing phased array PD architectures developed for 5G NR mmWave communication systems. As a further enhancement, the base station uses coprime sampling to estimate the AoA in case if some UEs utilize same pilot sequence for beam measurements.

Accordingly, the embodiments herein provide a method for determining the AoA of the signal by the base station. The method includes configuring, by the base station, different time intervals and multiple phase shifts across an antenna array of the base station. The method includes receiving, by the base station, the signal from User Equipments (UEs). at the different time intervals and the multiple phase shifts across the antenna array. The method includes estimating, by the base station, phase angles of the signal received at the different time intervals and the multiple phase shifts. The method includes determining, by the base station, the AoA of the signal received from the UEs based on the phase angles of the signal received at the different time intervals and the multiple phase shifts.

Accordingly, the embodiments herein provide a base station for determining the AoA of the signal. The base station includes a AoA estimating engine, a memory, a processor, where the AoA estimating engine is coupled, directly or indirectly, to the memory and/or the processor. The AoA estimating engine is configured for configuring the different time intervals and the multiple phase shifts across the antenna array of the base station. The AoA estimating engine is configured for receiving the signal from the UEs at the different time intervals and the multiple phase shifts across the antenna array. The AoA estimating engine is configured for estimating the phase angles of the signal received at the different time intervals and the multiple phase shifts. The AoA estimating engine is configured for determining the AoA of the signal received from the UEs based on the phase angles of the signal received at the different time intervals and the multiple phase shifts.

Unlike existing methods and systems, the proposed method provides a new antenna beam searching/refinement mechanism to reduce number of measurements compared to the conventional beam searching methods in the 5G NR systems, and thereby reducing overall delay incurred due to beam measurements. To enhance the beam searching capability, the base station simultaneously estimates the AoA of the signals coming from UEs in different directions using the single RF chain, where the same method extends to muti-RF chain scenario as well. Thereby, the methods helps to reduce an antenna beam search overhead for the hybrid beamforming architecture, and antenna beam searching time for the base station to identify appropriate narrow beams for data transmission with each UE.

Unlike existing methods and systems, the proposed method reduces access delays for NR millimeter wave, and can be used for future THz cellular access systems, which uses narrow antenna beams using the proposed beam searching method, which enhances cellular access mechanism and improves user experience.

Referring now to the drawings, and more particularly to FIGS. 2 through 9, there are shown preferred embodiments.

Figure 2:
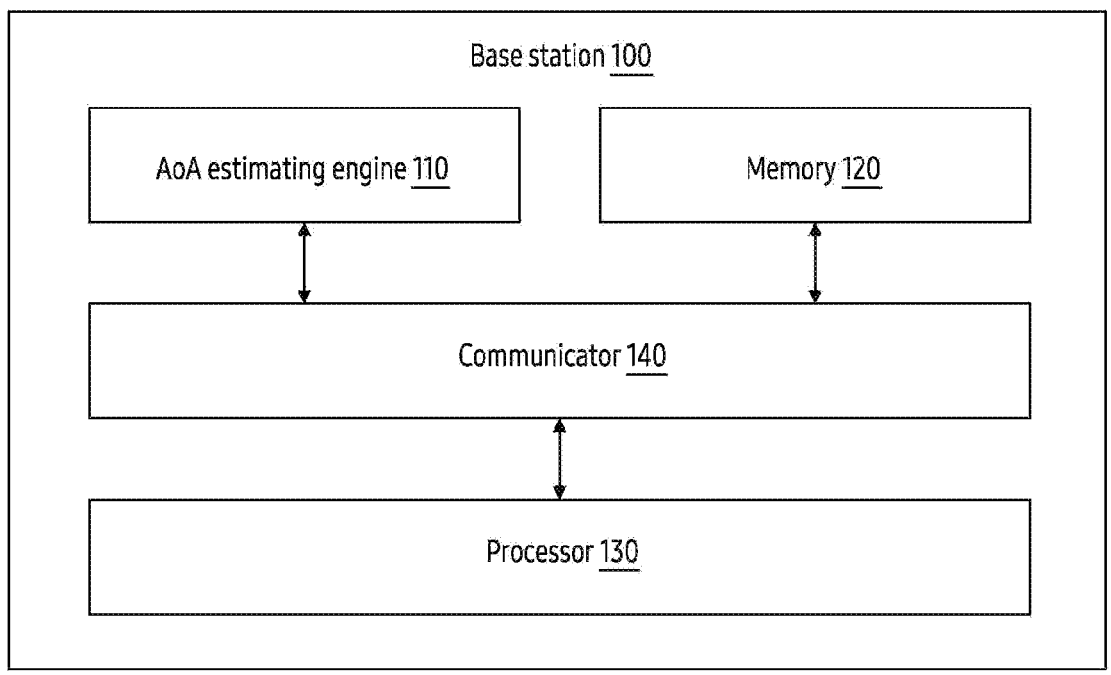
FIG. 2 is a block diagram of the base station for determining an AoA of a signal, according to an example embodiment.

FIG. 2 is a block diagram of the base station for determining an AoA of a signal, according to an example embodiment. An example of the base station (100) includes, but is not limited to a gNodeB. In an embodiment, the base station (100) includes an AoA estimating engine (110), a memory (120), a processor (130), and a communicator (140). The memory may, or may not be, part of the processor. The AoA estimating engine (110) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The AoA estimating engine (110) configures different time intervals (e.g. first time interval (T0), second time interval (T1), third time interval (T2)) and the multiple phase shifts (e.g. 61, 62) across the antenna array of the base station (100). Further, the AoA estimating engine (110) creates a wider beam using the antenna array. Further, the AoA estimating engine (110) receives a signal from the UEs

(20) at the different time intervals, and the multiple phase shifts across the antenna array via the wider beams, where a signal of one UE is orthogonal to a signal of other UEs. Further, the AoA estimating engine (110) estimates phase angles (e.g. φ1, φ2, φ3) of the signal received at the different time intervals and the multiple phase shifts. Further, the AoA estimating engine (110) determines the AoA of the signal received from the UEs (20) based on the phase angles of the signal received at the different time intervals and the multiple phase shifts. Upon determining the AoA of the signal, the AoA estimating engine (110) identifies a narrow beam generated using the antenna array, overlapping on the estimated AoA for data communication with the UEs (20).

In an embodiment, the AoA estimating engine (110) receives the signal from the UEs (20) at the first-time interval without applying unit shift across the antenna array. For an example, the unit shift is equal to d. Further, the AoA estimating engine (110) estimates a first phase angle (e.g. φ1) of the signal during reception of the signal at the first time interval without applying the unit shift across the antenna array. Further, the AoA estimating engine (110) receives the signal from the UEs (20) at the second time interval by applying one unit shift across the antenna array. Further, the AoA estimating engine (110) estimates a second phase angle (e.g. φ2) of the signal during reception of the signal at the second time interval by applying the one unit shift across the antenna array. Further, the AoA estimating engine (110) receives the signal from the UEs (20) at a third time interval by applying two unit shifts across the antenna array. Further, the AoA estimating engine (110) estimates a third phase angle (e.g. φ3) of the signal during reception of the signal at the third time interval by applying the two unit shift across the antenna array.

In an embodiment, for determining the AoA of the signal received from the UEs (20) based on the phase angles of the signal received at the different time intervals and the multiple phase shifts, the AoA estimating engine (110) determines a difference between the phase angles of the signal received at the different time intervals and the multiple phase shifts, where a first difference of the phase angles, $\varphi_C = \varphi_2 - \varphi_1$, and a second difference of the phase angles, $\varphi_f = \varphi_3 - \varphi_1$. Further, the AoA estimating engine (110) estimates the AoA of the signal received from the UEs (20) based on the difference between the phase angles. In an embodiment, the AoA estimating engine (110) determines $\sin^{-1}(\varphi_f \lambda/2\pi\delta_2)$ and $\sin^{-1}(\varphi_C \lambda/2\pi\delta_1)$, and checks whether $|\sin^{-1}(\varphi_C \lambda/2\pi\delta_1) - \sin^{-1}(\varphi_f \lambda/2\pi\delta_2)|$ smaller than ε, where λ is a wavelength of the signal and ε is typically 50. When $|\sin^{-1}(\varphi_C \lambda/2\pi\delta_1) - \sin^{-1}(\varphi_f \lambda/2\pi\delta_2)|$ is smaller than ε, then the AoA estimating engine (110) estimates the AoA of the signal receiving from the UE (20) as $\sin^{-1}(\varphi_f \lambda/2\pi\delta_2)$. When $|\sin^{-1}(\varphi_C \lambda/2\pi\delta_1) - \sin^{-1}(\varphi_f \lambda/2\pi\delta_2)|$ is not smaller than ε, then the AoA estimating engine (110) estimates the AoA of the signal receiving from the UE (20) as $\sin^{-1}((\varphi_f + 2\pi)\lambda/2\pi\delta_2)$.

In an embodiment, the AoA estimating engine (110) estimates a first total amplitude of signals received from multiple UEs (20) without applying the unit shift across the antenna array. Further, the AoA estimating engine (110) estimates a second total amplitude of signals received from the multiple UEs (20) by applying the one unit shift across the antenna array. Further, the AoA estimating engine (110) determines whether the first total amplitude is equal to the second total amplitude. The AoA estimating engine (110) estimates the phase angles of the signal received from each UE (20) at the different time intervals and the multiple phase shifts, when the first total amplitude is equal to the second total amplitude. The AoA estimating engine (110) determines the phase angles of the signal received from each UE (20) at the different time intervals and the multiple phase shifts on the received signals, when the first total amplitude is unequal to the second total amplitude.

Instead of switching the analog front end antenna, all antennas may be active and baseband may combine the antennas as required for calculation of the phase angles φ2 and φ1 21 by appropriately combining the m upper antennas and the n bottom antennas. In such scenario, the whole processing may be based on a single signal instead of taking three different states.

The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the base station (100), a cloud storage, or any other type of external storage.

The processor (130) is configured to execute instructions stored in the memory (120). The processor (130) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. The communicator (140) is configured for communicating internally between hardware components in the base station (100). Further, the communicator (140) is configured to facilitate the communication between the base station (100) and other devices via one or more networks (e.g. Radio technology). The communicator (140) includes an electronic circuit specific to a standard that enables wired or wireless communication. The communicator (140) includes RF chain(s) and an antenna array associated with each RF chain, where spacing between neighboring antennas of each antenna array is represented by "d" (refer FIGS. 4A-4C, 5, 9). In an example, d=0.75λ.

Figure 1B:
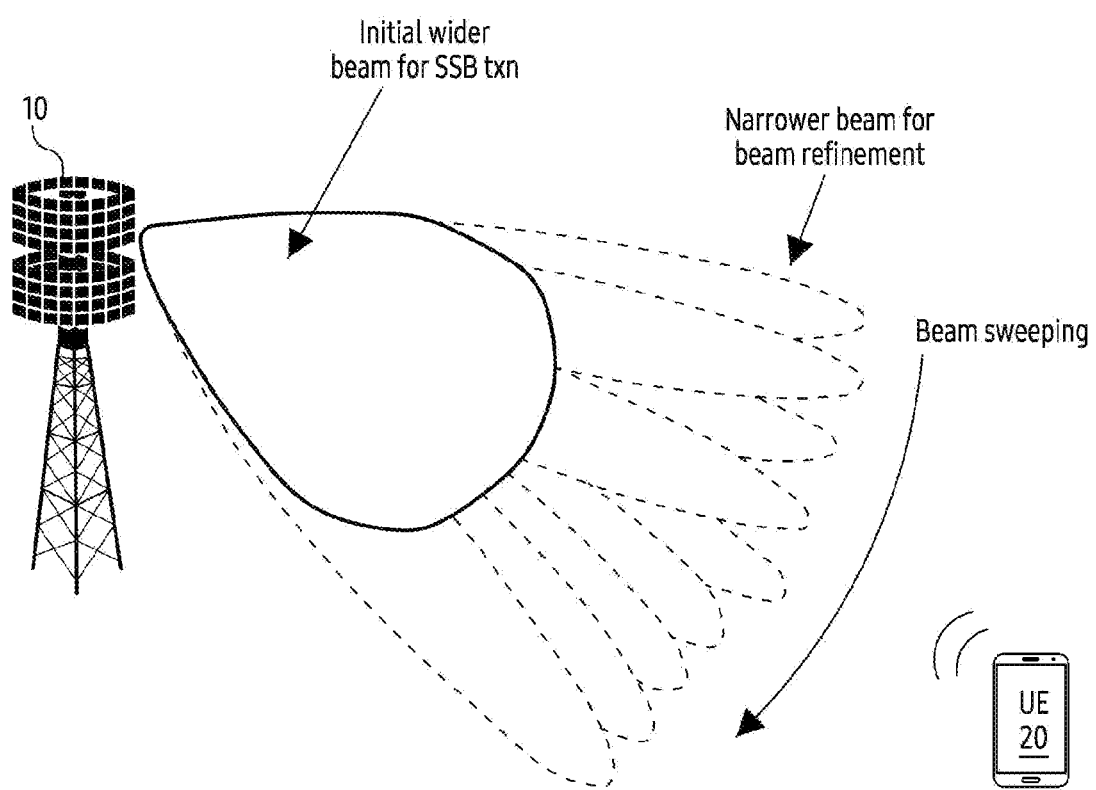
FIG. 1B is a schematic diagram illustrating a hierarchical beam search performing by a base station for a UE, according to a prior art.

Although the FIG. 1 shows the hardware components of the base station (100) but it is to be understood that other embodiments are not limited thereon. In other embodiments, the base station (100) may include less or a greater number of components. Further, the labels or names of the components are used only for illustrative purpose and does not limit the scope. One or more components can be combined together to perform same or substantially similar function for determining the AoA of the signal.

Figure 3A:
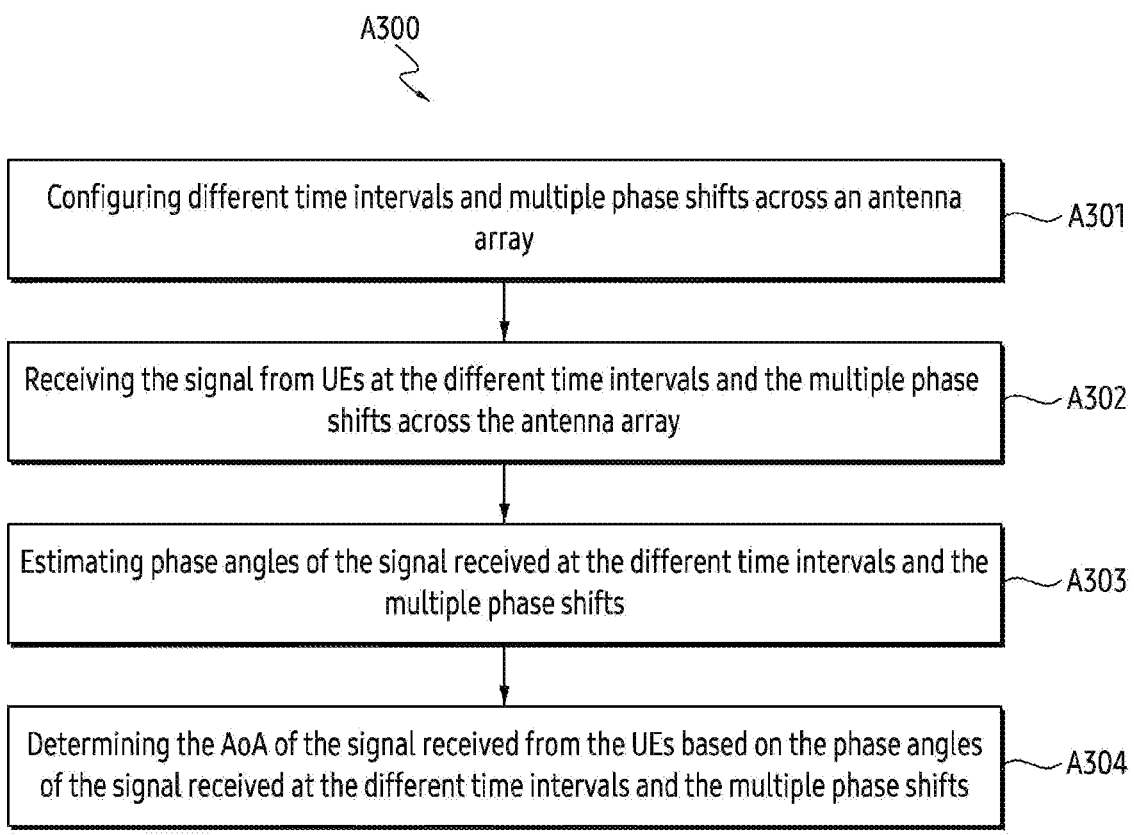
FIG. 3A is a flow diagram illustrating a method for determining the AoA of the signal, according to an example embodiment.

FIG. 3A is a flow diagram (A300) illustrating a method for determining the AoA of the signal, according to an example embodiment. In an embodiment, the method allows the AoA estimating engine (110) of FIG. 2 to perform steps A301-A304 of the flow diagram (A300). At step A301, the method includes configuring the different time intervals and the multiple phase shifts across the antenna array of the base station (100) of FIG. 2. At step A302, the method includes receiving the signal from the UEs (20) at the different time intervals and the multiple phase shifts across the antenna array. At step A303, the method includes estimating the phase angles of the signal received at the different time intervals and the multiple phase shifts. At step A304, the method includes determining the AoA of the signal received from the UEs (20) based on the phase angles of the signal received at the different time intervals and the multiple phase shifts.

The various actions, acts, blocks, steps, or the like in the flow diagram (A300) may be performed in the order presented, in a different order, or simultaneously. Further, in some embodiments, some of the actions, acts, blocks, steps, or the like may be omitted, added, modified, skipped, or the like without departing from the scope.

Figure 3B:
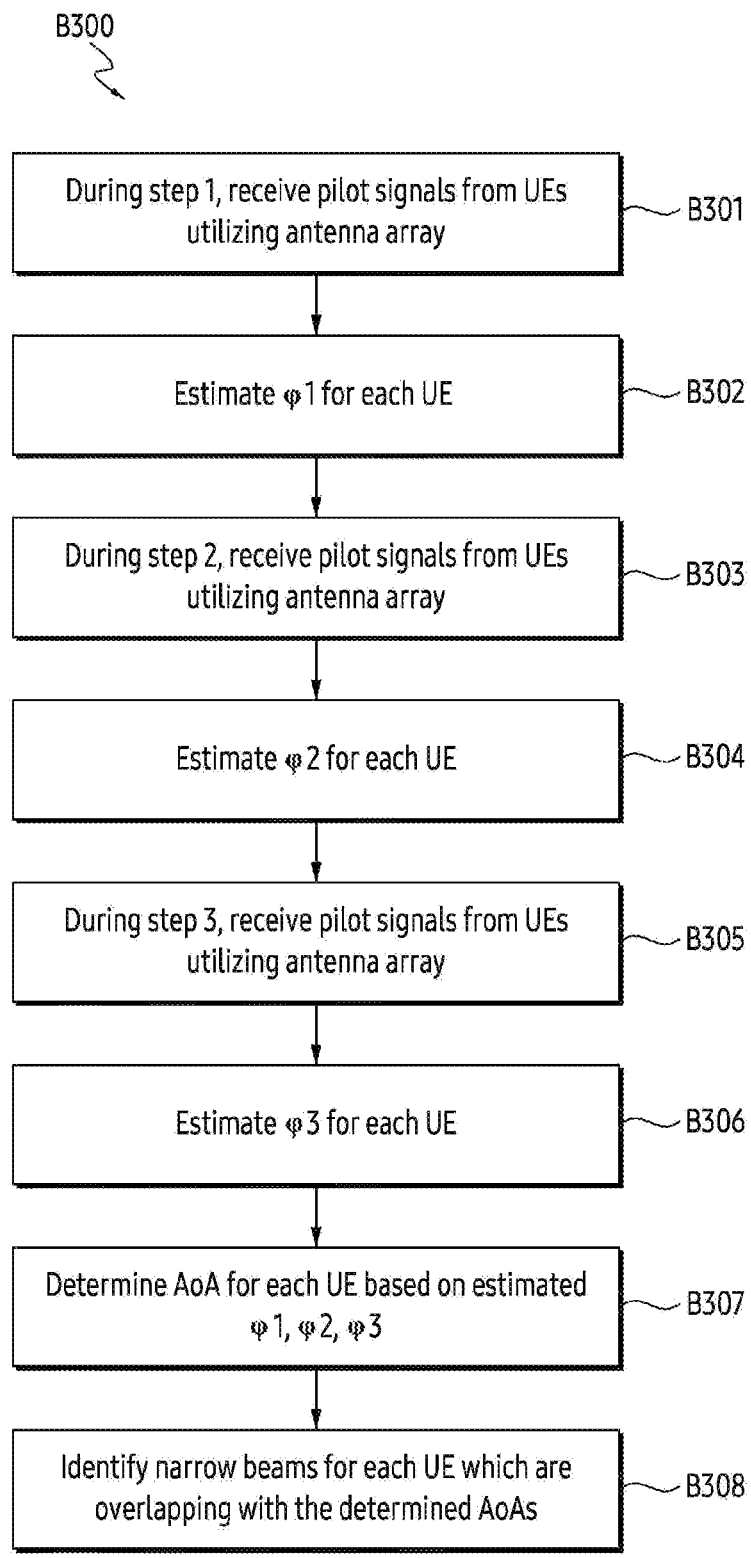
FIG. 3B is a flow diagram illustrating a method for estimating AoA for each UE for identifying narrow beams for each UE, according to an example embodiment.

FIG. 3B is a flow diagram (B300) illustrating a method for estimating the AoA for each UE for identifying narrow beams for each UE, according to an example embodiment. A three-step procedure of the proposed method for simultaneous estimation of the AoAs of signals received from different directions is disclosed in the flow diagram (B300). The AoA may be represented by θ in this disclosure. The AoA estimating engine (110), which may comprise processing circuitry and which may be part of the processor, performs from B301 to B308 of the flow diagram (B300). At B301-B302, the method includes receiving the pilot signals from the UEs (20) utilizing the antenna array of the base station (100) and estimating the phase angle φ1 for each UE (20) in a first step. At B303-B304, after making the antenna array shift δ1=d, the method includes receiving the pilot signals from the UEs (20) utilizing the antenna array of the base station (100) and estimating the phase angle φ2 for each UE (20) in a second step. At B305-B306, after making the antenna array shift δ2=2d, the method includes receiving the pilot signals from the UEs (20) utilizing the antenna array of the base station (100) and estimating the phase angle φ3 for each UE (20) in a third step. At B307, the method includes determining the AoA for each UE (20) based on estimated phase angles φ1, φ2, φ3. At B308, the method includes identifying the narrow beams for each UE (20) which are overlapping with the determined AoAs.

Figure 3C:
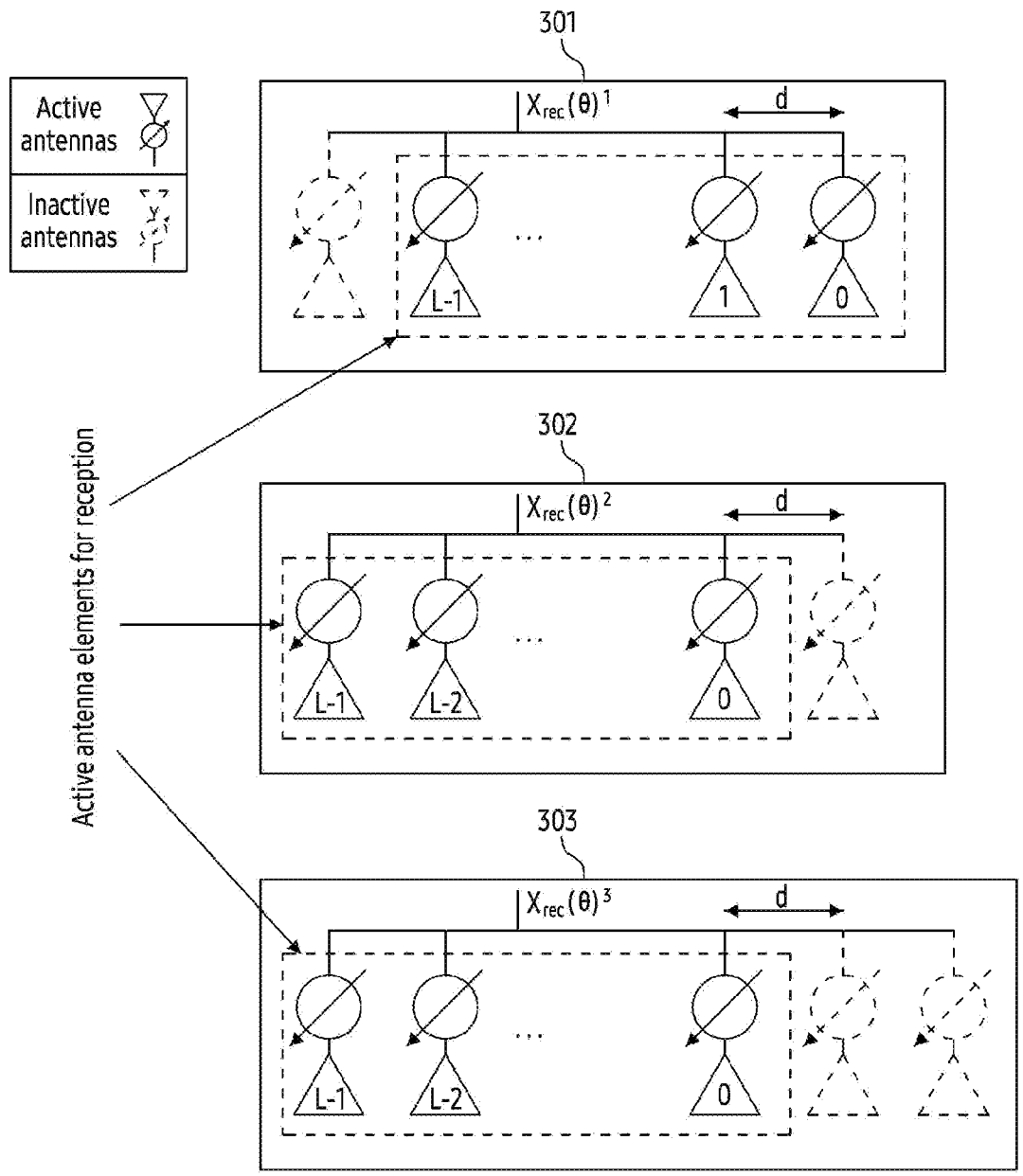
FIG. 3C illustrates a schematic diagram of active and inactive antennas of the antenna array for determining a total of pilot signals received from the UEs by the base station, according to an example embodiment.

FIG. 3C illustrates schematic diagram of active and inactive antennas of the antenna array for determining a total of pilot signals received from the UEs (20) by the base station (100), according to an example embodiment. At 301, the base station (100) activates initial L antenna elements of the antenna array and deactivates remaining antennas for receiving the pilot signals from the UEs (20). A signal received at an output of the antenna array with L antenna elements and the signal AoA (θ) is given in below equation.

$$X_{rec}(\theta)^1 = X_{UE}(\theta)^1 = \sum_{m=0}^{L-1} A e^{j\left(\frac{2\pi}{\lambda}\right)mdsin\theta_{UE}} + n$$

where, the parameter $A=h_{UE}(\theta)X'_{UE}(\theta)$ in which $h_{UE}(\theta)$ and $X'_{UE}(\theta)$ represent a channel coefficient for the UE (20) and a transmitted reference signal of the UE (20) respectively. n denotes Additive white Gaussian noise (AWGN).

At 302, the base station (100) performs the antennas array shift (e.g. shift=d) by activating next L antennas of the antenna array and deactivates remaining antennas for receiving the pilot signals from the UEs (20). A signal received at an output of the antenna array with L antenna elements and the signal AoA (θ) is given in below equation.

$$X_{rec}(\theta)^2 = X_{UE}(\theta)^2 = e^{j\left(\frac{2\pi}{\lambda}\right)dsin\theta_{UE}}X_{rec}(\theta)^1 + n = f(X_{rec}(\theta)^1, d) + n$$

where, $X_{rec}(\theta)^1$ is a Fourier transform of the parameter A (e.g. a constant), where the parameter A is a function of array-element location m as such, shift in array location results in a phase rotation in the corresponding Fourier transform $X_{rec}(\theta)^2$. Under ideal circumstances without noise, the base station (100) determines the AoA using an equation given below.

$$\theta_{UE}^2 = \sin^{-1}\left(\arg\left(\frac{X_{rec}(\theta)^2}{X_{rec}(\theta)^1}\right)\frac{\lambda}{2\pi d}\right) = \sin^{-1}\left((\arg(X_{rec}(\theta)^2) - \arg(X_{rec}(\theta)^1))\frac{\lambda}{2\pi d}\right),$$

$$e.g.\ \theta_{UE}^2 = \sin^{-1}\left((\varphi 2 - \varphi 1)\frac{\lambda}{2\pi d}\right) = \sin^{-1}\left(\varphi_C \frac{\lambda}{2\pi d}\right).$$

The base station (100) uses wider antenna beams for simultaneous AoA estimation of the multiple UEs located at different geographical locations. However, operation with the wider antenna beams at mmWave or THz frequencies results in low SNR and degrades AoA estimation performance, e.g. the estimated AoA can significantly vary from a true AoA of the signal from the UE (20). The base station (100) uses the estimated AoA to select one of the appropriate narrow beam for data transmission with the UE (20). However, due to the possible error in the AoA estimation, a wrong antenna beam can be selected, which degrades the throughput of the given link. To reduce the degradation in the performance, we use a larger shift in the antenna array. For example, the shift=2d or 3d to determine the AoA of the given UE (20). The antenna array shift of 2d is depicted in 303. With 2d antenna array shift, the received signal at output of the antenna array is given in below equation.

$$X_{rec}(\theta)^3 = e^{j\left(\frac{2\pi}{\lambda}\right)2dsin\theta_{UE}}X_{rec}(\theta)^1 + n = f(X_{rec}(\theta)^1, 2d) + n$$

Under ideal circumstances without noise, the base station (100) determines the AoA using an equation given below.

$$\theta_{UE}^3 =$$

$$\sin^{-1}\left(\arg\left(\frac{X_{rec}(\theta)^3}{X_{rec}(\theta)^1}\right)\frac{\lambda}{2\pi 2d}\right) = \sin^{-1}\left((\arg(X_{rec}(\theta)^3) - \arg(X_{rec}(\theta)^1))\frac{\lambda}{2\pi 2d}\right),$$

$$e.g.\ \theta_{UE}^3 = \sin^{-1}\left((\varphi 3 - \varphi 1)\frac{\lambda}{2\pi d}\right) = \sin^{-1}\left(\varphi_f \frac{\lambda}{2\pi 2d}\right).$$

For the same received SNR, the AoA estimated with larger array shift has smaller variance compared to the AoA estimated with smaller array shift. This ensures the probability of incorrect selection of narrow antenna beam for UE is minimized or reduced. However, larger array shift can lead to an aliasing effect where an ambiguity in identifying AoA can be occurred. This effect can be explained with the following example. Suppose d=λ, then AoAs are 40° and 140° and leads to the same phase (φ3−φ1), which leads to ambiguity in estimating AoA of the UE, because the AoAs 40° and 140° are the possible candidates. The ambiguity in estimating AoA is resolved by the proposed three-step procedure.

Figure 4A:
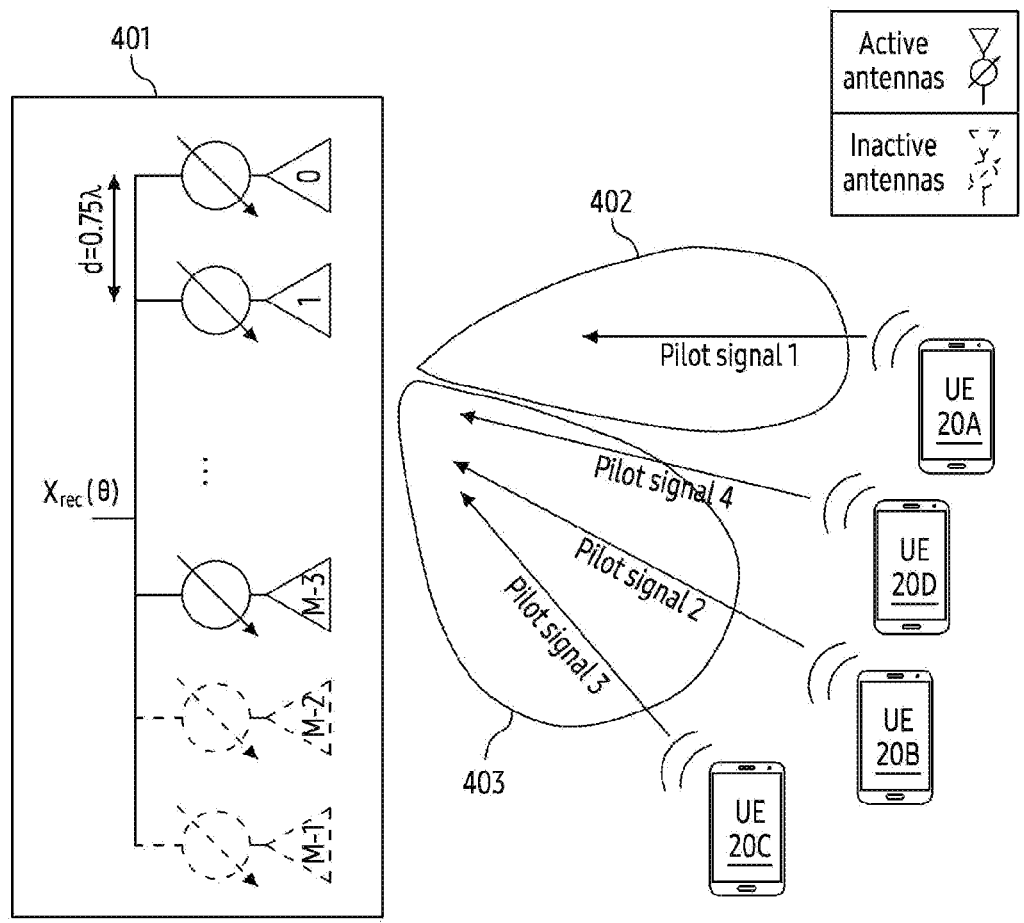
FIGS. 4A-4C are schematic diagrams illustrating three step procedure of the proposed method for simultaneous estimation of the AoAs of signals receiving from different directions, according to an example embodiment.
Figure 4B:
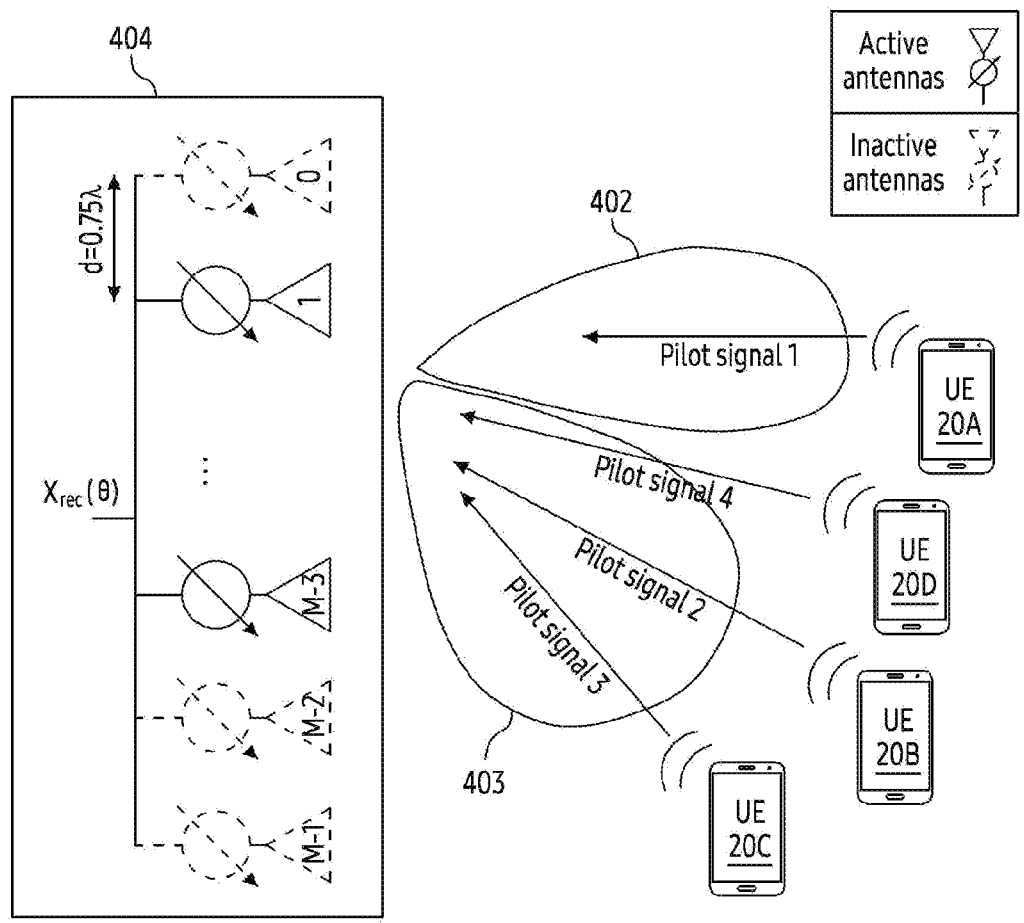
Figure 4C:
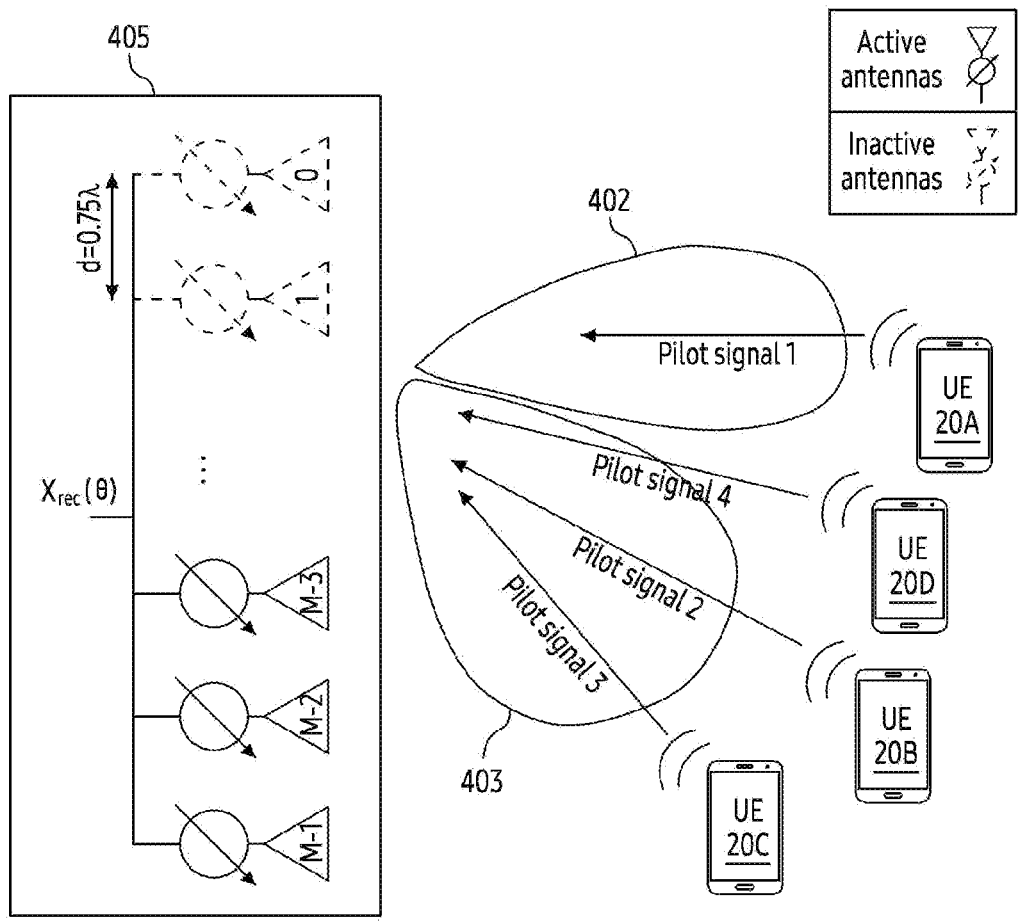

FIGS. 4A-4C are schematic diagrams illustrating the three-step procedure of the proposed method for simultaneous estimation of the AoAs of signals receiving from different directions, according to an example embodiment. Consider, the base station (100) has the RF chain with the antenna array includes M number of antennas arranged with the spacing (d) between neighboring antennas is equal to 0.75 k as shown in 401, 404, 405, where M=2, 3, 4, etc. Further, the base station (100) generates wider beams (402, 403) using the antenna array and receives the orthogonal pilot signals (Pilot signal 1, Pilot signal 2, Pilot signal 3, Pilot signal 4) from the UEs (20A-20D) via the wider beams (402, 403).

The first step in the estimation of the AoAs of signals shown in the FIG. 4A. As shown in 401, the base station (100) enables 0 to M−3 antennas, and disables remaining antennas (M−2 and M−1), in which the antenna array shift δ0=0. Further, the base station (100) generates the slightly wider beams (402, 403) using the active antennas, and receives the orthogonal pilot signals from the UEs (20A-20D) via the wider beams (402, 403). The total of the pilot signals received at the antenna array with M−2 antennas and the signal AoA (θ) is given in below equation:

$$X_{rec}(\theta)=X_{UE1}(\theta)+X_{UE2}(\theta)+X_{UE3}(\theta)+X_{UE4}(\theta)$$

where $X_{UE1}(\theta)$ is the pilot signal of the UE (20A), $X_{UE2}(\theta)$ is the pilot signal of the UE (20B), $X_{UE3}(\theta)$ is the pilot signal of the UE (20C), and $X_{UE4}(\theta)$ is the pilot signal of the UE (20D). Further, the base station (100) estimates the phase angle φ1 of each pilot signal in the received signal.

The second step in the estimation of the AoAs of signals shown in the FIG. 4B. As shown in 404, the base station (100) creates the antenna array shift δ1 of "d" by enabling 1 to M−2 antennas, and disabling remaining antennas (0 and M−1). Further, the base station (100) generates the wider beams (402, 403) using the active antennas, and receives the orthogonal pilot signals from the UEs (20A-20D) via the wider beams (402, 403). The total of the pilot signals received at the antenna array with M−2 antennas and the signal AoA (θ) is given in below equation:

$$X_{rec}(\theta) = X_{UE1}(\theta)e^{j\left(\frac{2\pi}{\lambda}\right)\delta 1 \sin\theta_{UE1}} + X_{UE2}(\theta)e^{j\left(\frac{2\pi}{\lambda}\right)\delta 1 \sin\theta_{UE2}} + X_{UE3}(\theta)e^{j\left(\frac{2\pi}{\lambda}\right)\delta 1 \sin\theta_{UE3}} + X_{UE4}(\theta)e^{j\left(\frac{2\pi}{\lambda}\right)\delta 1 \sin\theta_{UE4}},$$

where $$X_{UE1}(\theta)e^{j\left(\frac{2\pi}{\lambda}\right)\delta 1 \sin\theta_{UE1}}$$

is the pilot signal of the UE (20A), $$X_{UE2}(\theta)e^{j\left(\frac{2\pi}{\lambda}\right)\delta 1 \sin\theta_{UE2}}$$

is the pilot signal of the UE (20B), $$X_{UE3}(\theta)e^{j\left(\frac{2\pi}{\lambda}\right)\delta 1 \sin\theta_{UE3}}$$

is the pilot signal of the UE (20C), and $$X_{UE4}(\theta)e^{j\left(\frac{2\pi}{\lambda}\right)\delta 1 \sin\theta_{UE4}}$$

is the pilot signal of the UE (20D). Further, the base station (100) estimates the phase angle φ2 of each pilot signal in the received signal.

The third step in the estimation of the AoAs of signals shown in the FIG. 4C. As shown in 405, the base station (100) creates the antenna array shift δ2 of "2d" by enabling 2 to M−1 antennas, and disabling remaining antennas (0 and 1). Further, the base station (100) generates the wider beams (402, 403) using the active antennas, and receives the orthogonal pilot signals from the UEs (20A-20D) via the wider beams (402, 403). The total of the pilot signals received at the antenna array with M−2 antennas and the signal AoA of θ is given in below equation:

$$X_{rec}(\theta) = X_{UE1}(\theta)e^{j\left(\frac{2\pi}{\lambda}\right)\delta 2 \sin\theta_{UE1}} + X_{UE2}(\theta)e^{j\left(\frac{2\pi}{\lambda}\right)\delta 2 \sin\theta_{UE2}} + X_{UE3}(\theta)e^{j\left(\frac{2\pi}{\lambda}\right)\delta 2 \sin\theta_{UE3}} + X_{UE4}(\theta)e^{j\left(\frac{2\pi}{\lambda}\right)\delta 2 \sin\theta_{UE4}},$$

where $$X_{UE1}(\theta)e^{j\left(\frac{2\pi}{\lambda}\right)\delta 2 \sin\theta_{UE1}}$$

is the pilot signal of the UE (20A), $$X_{UE2}(\theta)e^{j\left(\frac{2\pi}{\lambda}\right)\delta 2 \sin\theta_{UE2}}$$

is the pilot signal of the UE (20B), $$X_{UE3}(\theta)e^{j\left(\frac{2\pi}{\lambda}\right)\delta 2 \sin\theta_{UE3}}$$

is the pilot signal of the UE (20C), and $$X_{UE4}(\theta)e^{j\left(\frac{2\pi}{\lambda}\right)\delta 2 \sin\theta_{UE4}}$$

is the pilot signal of the UE (20D). Further, the base station (100) estimates the phase angle φ3 of each pilot signal in the received signal.

Figure 5:
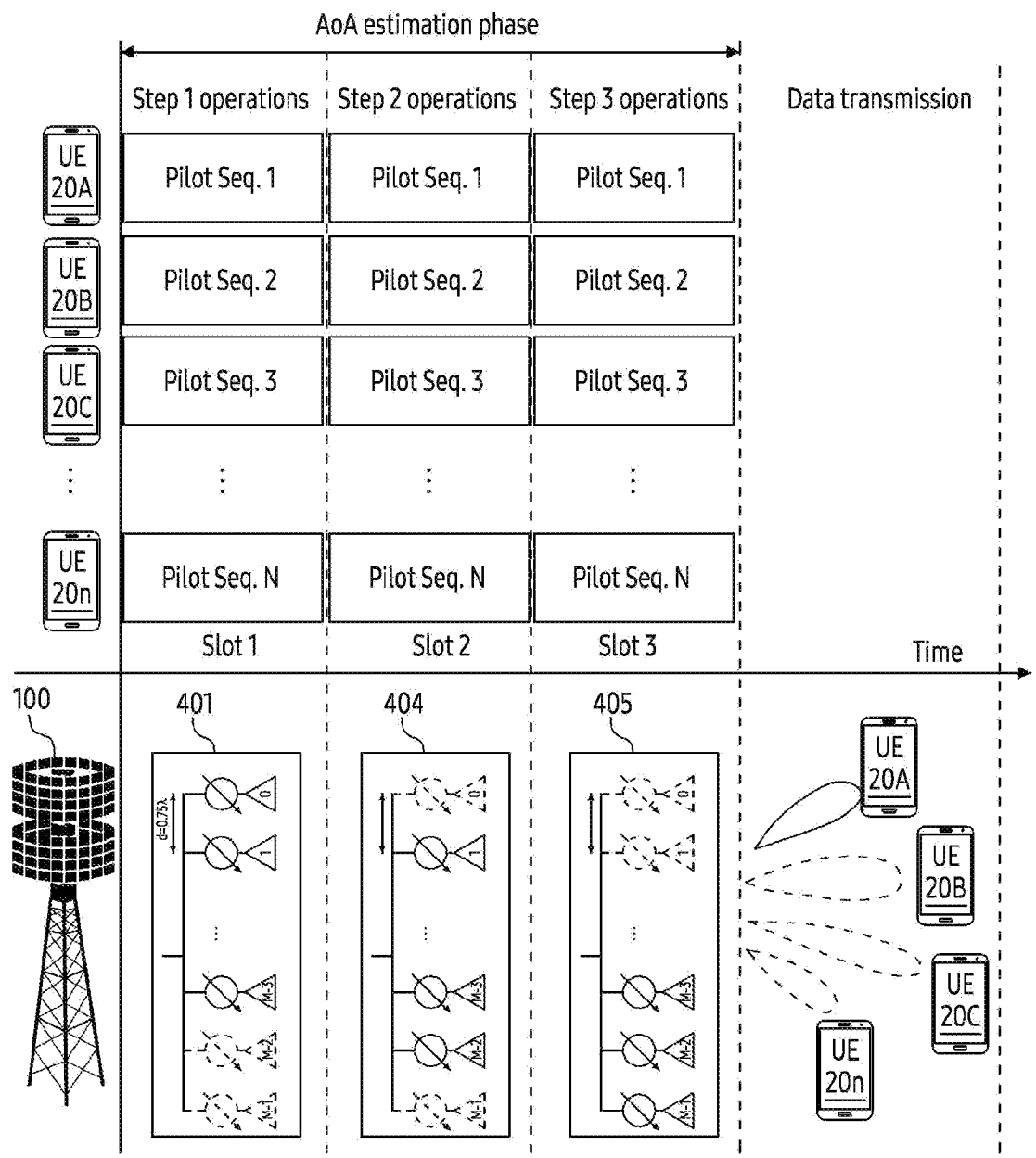
FIG. 5 is a schematic diagram illustrating a time frame structure and a signal flow for the proposed three step AoA estimation procedure, according to an example embodiment.

FIG. 5 is a schematic diagram illustrating a time frame structure and a signal flow for the proposed three step AoA estimation procedure, according to an example embodiment. At time slot 1, the base station (100) receives the pilot signals from the UEs (20A to 20n) simultaneously using the wider beam generated without the antenna array shift (401). At time slot 2, the base station (100) receives the pilot signals from the UEs (20A to 20n) simultaneously using the wider beam generated with the antenna array shift (404) 61. At time slot 3, the base station (100) receives the pilot signals from the UEs (20A to 20n) simultaneously using the wider beam generated with the antenna array shift (405) 62. Further, the base station (100) estimates the AoA of the signals received from each UE (20A-20n), and identifies the narrow beam overlaps on the AoA. Further, the base station (100) performs data transmission with the UE (20A-20n) using the identified narrow beam.

Figure 6:
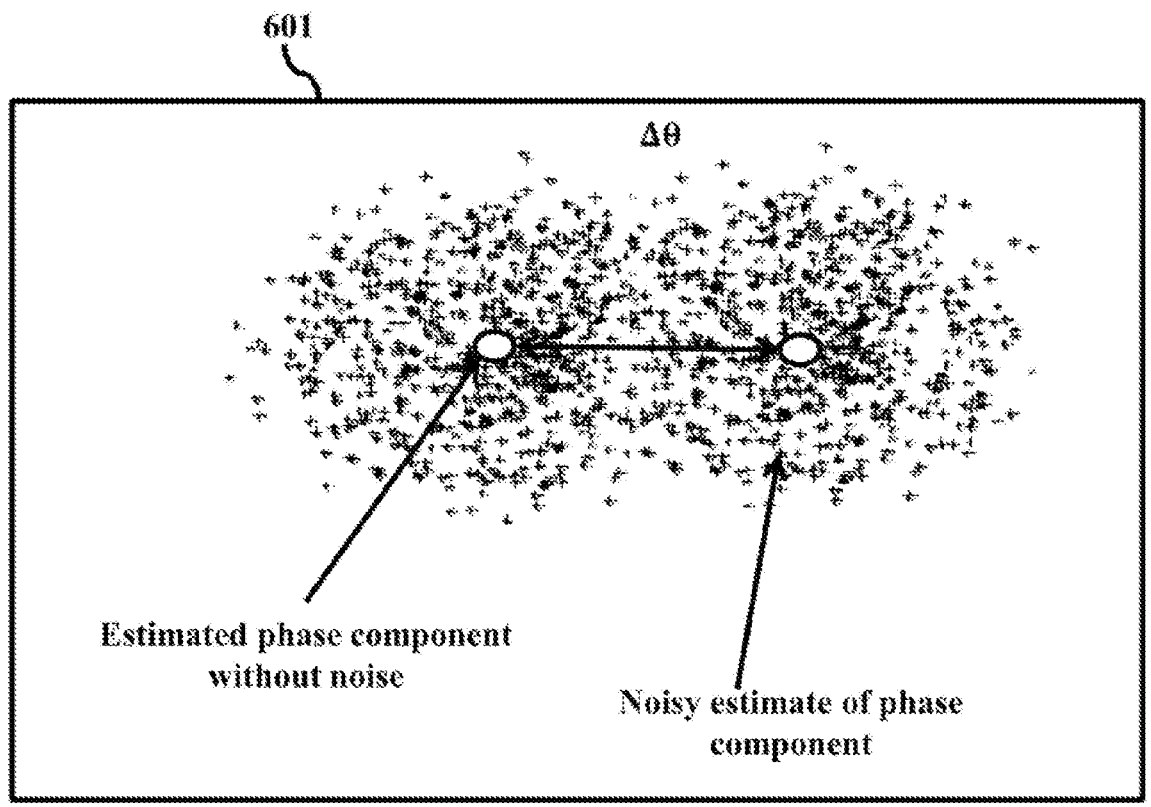
FIG. 6 is a schematic diagram illustrating a noisy estimates of received signal phase, according to an example embodiment.
Figure 6:
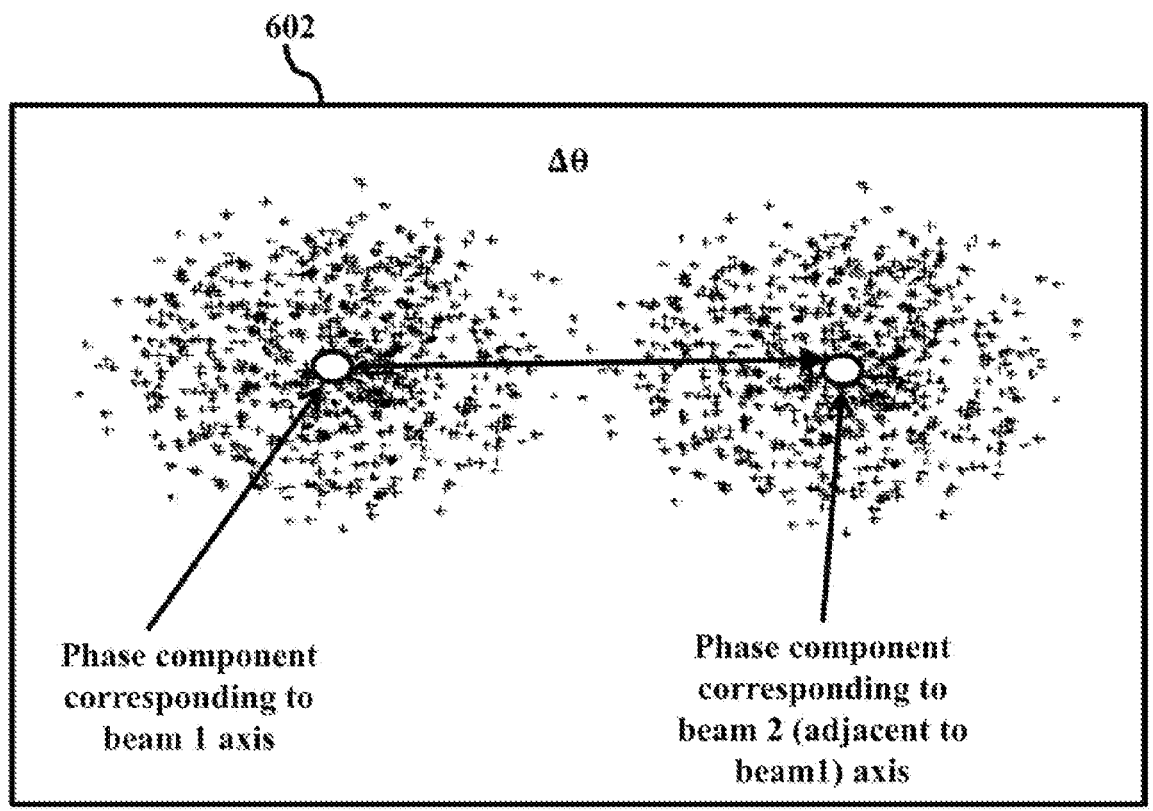

FIG. 6 is a schematic diagram illustrating a noisy estimates of received signal phase, according to an example embodiment. The AoA for each UE signal is determined from the relations φ2–φ1, φ3–φ1, e.g., shift across wavefront domain or equivalently across the antenna array introduces a phase rotation in angular dimension (sin θ dimension) and an amount of phase rotation is a function of shift amount and the AoA (θ). Signals from different directions experience different phase shifts upon shifting the antenna array. Even two signals coming inside a single beam also show different phase shifts, which can be estimated using the proposed method. The base station (100) determines individual phase shifts using the orthogonal pilot signals send by each UE (20). Two base station (100) shifts M and 62 are important for the estimation of exact AoAs of the pilot signals. With a smaller δ1, the base station (100) determines a coarse estimate of AoA (susceptible to noise). Estimated phase component without noise, and noisy estimate of phase component due to the smaller δ1 is shown in 601. With a larger δ2, the base station (100) determines a finer estimate of the AoA. Phase component corresponding to beam 1 axis, and phase component corresponding to beam 2 (adjacent to beam 1) axis is shown in 602. In the proposed method, the spectral aliasing issue resulting due to a larger δ2 is handled by combining measurement results in the steps 2 and 3 of the three step AoA estimation procedure.

Figure 7:
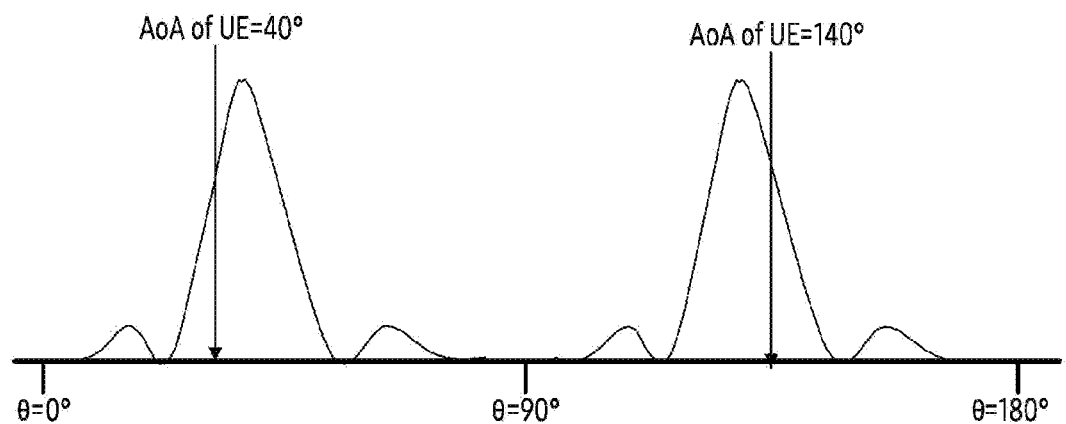
FIG. 7 is a graph for showing a spatial aliasing generating at the base station due to a large array shift, according to an example embodiment.

FIG. 7 is a graph for showing a spatial aliasing generating at the base station (100) due to the large array shift, according to an example embodiment. The larger shift in the antenna array gives good resolution for determining multiple UE AoAs inside a single beam under low signal-to-noise ratio at the cost of spatial aliasing that leading to ambiguity in identifying the AoA. This effect can be explained with the following example. Suppose d=λ, then the AoAs are 40° and 140° and leads to the same phase (φ3–φ1), which leads to ambiguity in estimating AoA of the UE, because the AoAs 40° and 140° are the possible candidates. The ambiguity in estimating AoA is resolved by combining measurement results in the steps 2 and 3 of the three step AoA estimation procedure.

Figure 8:
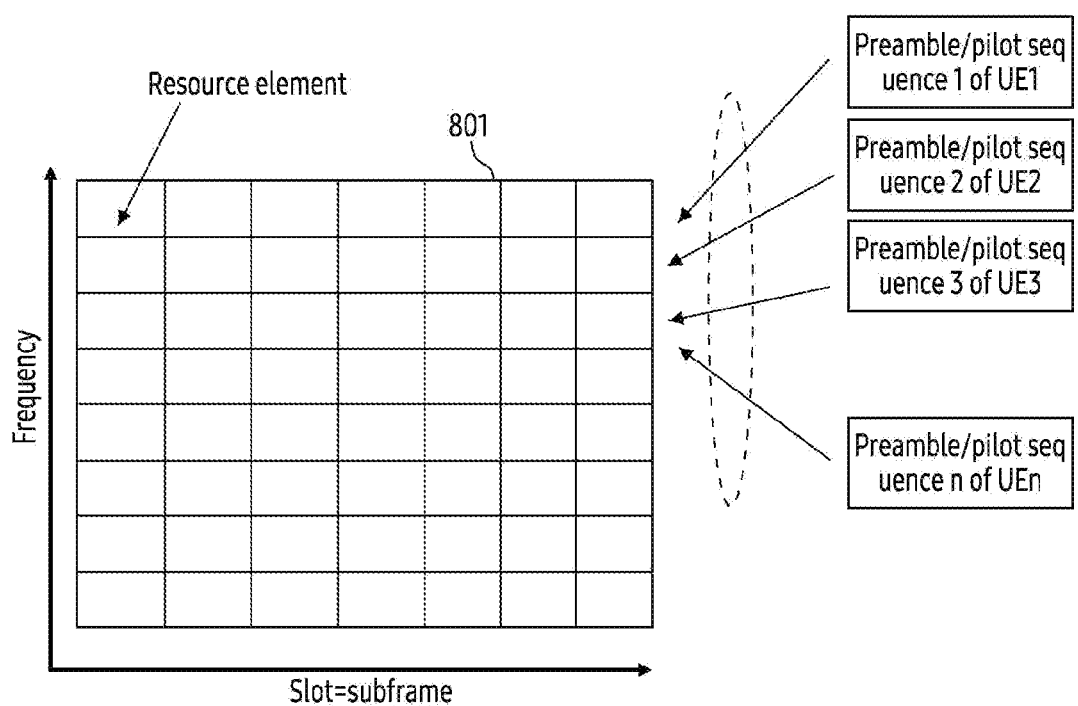
FIG. 8 is a schematic diagram illustrating pilot signals from the UEs in time-frequency resource grid, according to an example embodiment.

FIG. 8 is a schematic diagram illustrating the pilot signals from the UEs (20) in the time-frequency resource grid, according to an example embodiment. A signal transmission and receiving mechanism at the base station (100) is based on a time frame structure (801). The signal transmission in each time slot of the AoA estimation phase angle can be depicted as the transmission of the pilot signals from the UEs (20) in time-frequency resource grid. A pilot/preamble sequence of one UE (20) is represented by a color resource grid contains a mix of RACH signals from different UEs. The base station (100) performs operations 1 and 2 during every time slot (every steps) of AoA estimation phase angle. In operation 1, the base station (100) receives the transmitted pilot signal from the UEs using one of the antenna array configuration during the 3-step procedure and obtains corresponding time-frequency grid via discrete Fourier transform. In operation 2, the base station (100) determines the phase angle φk of the received signal of each UE (20) at step k. $X_{UEi}(\theta)^k$ denotes the received signal for $i^{th}$ UE during step k. The phase angle (plc of the signal during step k is determined using the equation given below.

$$\varphi k = \arg(X_{UEi}(\theta)^k) = \arg\left(\sum_{m=0}^{L-1}(h_{UEi}(\theta)X^t{}_{UEi}(\theta)\cdot^k)e^{j\left(\frac{2\pi}{\lambda}\right)(md+(k-1)d)sin\theta_{UE}} + n\right),$$

where $X^t{}_{UEi}(\theta)\cdot^j$ denotes the preamble sequence of ith UE for the given resource element. Once (plc is determined for all the three steps (e.g. k∈{1, 2, 3}), the base station (100) determines individual AoAs for each UE (100) using based on the difference between the phase angles.

Figure 9:
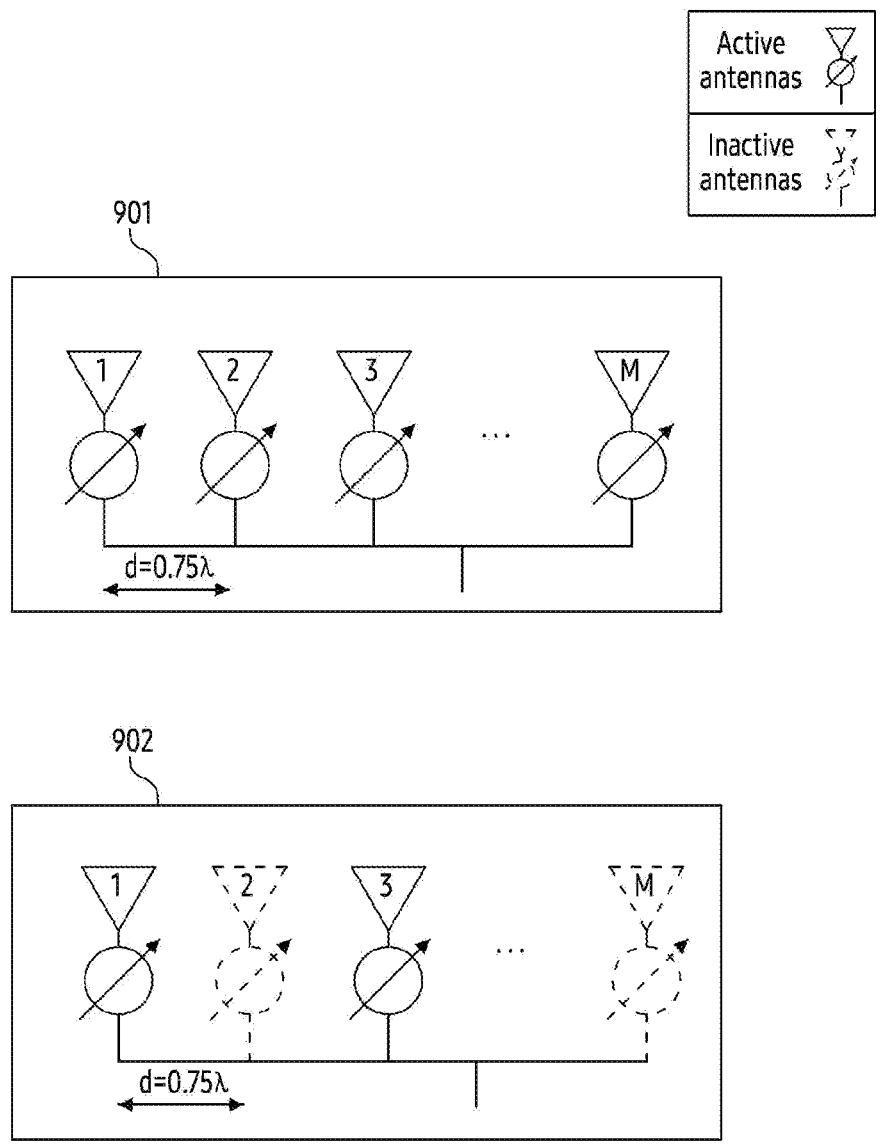
FIG. 9 is a schematic diagram illustrating shifting in the antenna array of the base station for co-prime sampling, according to an example embodiment.

FIG. 9 is a schematic diagram illustrating shifting in the antenna array of the base station (100) for co-prime sampling, according to an example embodiment. When the UEs (20) employ non-orthogonal sequences for the pilot signals and the UEs transmit with same sequence for estimation, then a collision of pilot signals will occur at the base station (100). The base station (100) detects the collision by determining the amplitude of the received signal which is different from the received signal amplitude before applying shift. If the collision is detected, then the base station (100) determines individual phase component of each UE using the co-prime sampling, e.g., applying subsampling rates which are co-prime to each other. The co-prime sampling with sub-sampling rate R1 is shown in 901 and whereas the co-prime sampling with sub-sampling rate R2 is shown in 902. In 901, all antenna elements are active in the array, wherein in 902 alternate antennas are only active. Coprime sampling ensures that any two spatial frequencies (sine of AoA) collide in one realization (corresponding to one sampling frequency) will not collide in the other realization (corresponding to second sampling frequency). The collision can be resolved by iterating between two realizations.

Each embodiment herein may be used in combination with any other embodiment(s) described herein.

Based on the hierarchical beam searching employed in 5G specification with sector antenna beam width of 40 degrees and pencil beams with beamwidth 10 degrees, the search complexity inside a sector is approximately 4 milliseconds (assuming 1 millisecond for each measurement). Total measurement time for 3 sectors requires 12 millisecond (3*4 milliseconds). However, the proposed three step procedure needs 3 milliseconds (3*millisecond) for AoA identification involving 3 sectors, since all the 3 sectored beams are generated simultaneously. As such, the latency improvement for the proposed method is 4-fold in this example. "Based on" as used herein covers based at least on.

Conventional systems employ a hierarchical beam searching mechanism to identify useful beams for data transmission. In millimeter wave/THz wave systems, wider sectored beam patterns are used for initial level channel measurements and neighbor discovery. The half power beamwidth for sectored beams is typically around 30-40 degrees. In hierarchical approach, firstly a given sector is identified from a set of non-overlapping sectors based on beam measurements and then a narrow beam inside the chosen sector is identified. Our proposed scheme avoids the requirement of second stage in which a number of narrower beams are required to be investigated. Thereby, reducing the time required to identify a given narrow beam.

The proposed method is also useful to estimate AoA of the UE (200) while it is moving. The accuracy of the estimation process depends on the extend of the variability of the AoA due to mobility of the UE (200). For example, with the UE velocity of 80 km/hr (22.2 m/s) and frame duration of 1 millisecond, the worst case AoA change between step 1 and step 3 can be calculated as 0.38 degrees (with Tx Rx reparation of 10 m) and 0.76 degrees (with Tx Rx separation of 50 m). Aforementioned change in AoA is very negligible and the proposed method can provide AoA estimates with reasonably good accuracy In an embodiment, the base station (100) improves accuracy of the beam selection by performing additional channel measurements using the narrow beams with corresponding beam axis close to the estimated AoA.

The proposed multi-resolution AoA estimation helps to reduce the search complexity for beam identification in the 5G NR mmWave by reducing latency of the beam search in 5G NR mmWave. Overall search complexity is reduced by a factor $$\left(\frac{N}{3}\left\lceil\frac{BW1}{BW0}\right\rceil\right),$$

where N is the number of simultaenous beams generated using the proposed method, BW0 and BW1 corresponding to the antenna beamwidth used in the 5G NR mmWave and proposed method, respectively. With N=3, BW0=10°, BW1=40°, search complexity will be of the order of 4. For a subframe duration of 1 millisecond, the hierarchical beam searching based 5G NR system requires 12 milliseconds for searching 3 sectors, whereas, the proposed scheme requires only 3 milliseconds for searching 3 sectors. Moreover, the proposed method is a potential candidate for upcoming THz communications since such systems are expected to employ very narrow beams to compensate huge pathloss at THz bands (in turn results in high beam searching and tracking duration).

Figure 10:
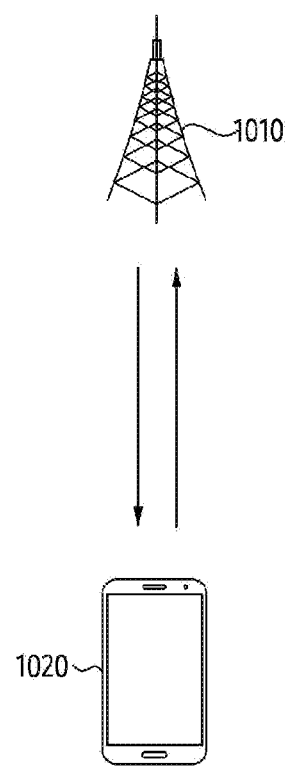
FIG. 10 is a diagram illustrating an example of a wireless communication system according to various embodiments.

FIG. 10 is a diagram illustrating an example of a wireless communication system according to various embodiments.

Referring to FIG. 10, it illustrates a base station 1010 and a terminal 1020 as parts of nodes using a wireless channel in a wireless communication system. Although FIG. 10 illustrates only one base station, the wireless communication system may further include another base station that is the same as or similar to the base station 1010.

The base station 1010 is a network infrastructure that provides wireless access to the terminal 1020. The base station 1010 may have a coverage defined based on a distance capable of transmitting a signal. In addition to the term 'base station', the base station 1010 may be referred to as 'access point (AP)', 'eNodeB (eNB)', '5th generation node', 'next generation nodeB (gNB)', 'wireless point', 'transmission/reception', or other terms having the same or equivalent meaning thereto.

The terminal 1020, which is a device used by a user, performs communications with the base station 1010 through a wireless channel. A link from the base station 1010 to the terminal 1020 is referred to as a downlink (DL), and a link from the terminal 1020 to the base station 1010 is referred to as an uplink (UL). Further, although not shown in FIG. 10, the terminal 1020 and other terminals may perform communications with each other through the wireless channel. In this context, a link between the terminal 1020 and another terminals (device-to-device link, D2D) is referred to as a side link, and the side link may be used mixed with a PC5 interface. In some other embodiments of the disclosure, the terminal 1020 may be operated without any user's involvement. According to an embodiment of the disclosure, the terminal 1020 is a device that performs machine-type communication (MTC) and may not be carried by a user. In addition, according to an embodiment of the disclosure, the terminal 1020 may be a narrowband (NB)-Internet of things (IoT) device.

The terminal 1020 may be referred to as 'user equipment (UE), 'customer premises equipment (CPE), 'mobile station', 'subscriber station', 'remote terminal', 'wireless terminal', 'electronic device', 'user device', or any other term having the same or equivalent technical meaning thereto.

The base station 1010 may perform beamforming with the terminal 1020. The base station 1010 and the terminal 1020 may transmit and receive radio signals in a relatively low frequency band (e.g., FR 1 (frequency range 1) of NR). Further, the base station 1010 and the terminal 1020 may transmit and receive radio signals in a relatively high frequency band (e.g., FR 2 of NR (or FR 2-1, FR 2-2, FR 2-3), FR 3, or millimeter wave (mmWave) bands (e.g., 28 GHz, 30 GHz, 38 GHz, GHz)). In order to improve the channel gain, the base station 1010 and the terminal 1020 may perform beamforming. In this context, the beamforming may include transmission beamforming and reception beamforming. The base station 1010 and the terminal 1020 may assign directionality to a transmission signal or a reception signal. To that end, the base station 1010 and the terminal 1020 may select serving beams through a beam search or beam management procedure. After the serving beams are selected, subsequent communication may be performed through a resource having a quasi-co located (QCL) relationship with a resource that has transmitted the serving beams.

A first antenna port and a second antenna port may be evaluated to be in such a QCL relationship, if the wide-scale characteristics of a channel carrying symbols on the first antenna port can be estimated from a channel carrying symbols on the second antenna port. For example, the wide-scale characteristics may include at least one of delay spread, Doppler spread, Doppler shift, average gain, average delay, and spatial receiver parameters.

Although in FIG. 10, both the base station 1010 and the terminal 1020 are described as performing beamforming, embodiments of the disclosure are not necessarily limited thereto. In some embodiments of the disclosure, the terminal may or may not perform beamforming. Likewise, the base station may or may not perform beamforming. That is to say, only either one of the base station and the terminal may perform beamforming, or both the base station and the terminal may not perform beamforming.

In the disclosure, a beam means a spatial flow of a signal in a radio channel, and may be formed by one or more antennas (or antenna elements), of which formation process may be referred to as beamforming. The beamforming may include at least one of analog beamforming and digital beamforming (e.g., precoding). Reference signals transmitted based on beamforming may include, for example, a demodulation-reference signal (DM-RS), a channel state information-reference signal (CSI-RS), a synchronization signal/physical broadcast channel (SS/PBCH), or a sounding reference signal (SRS). Further, for a configuration for each reference signal, an IE, such as a CSI-RS resource, an SRS-resource, or the like may be used, and the configuration may include information associated with a beam. Beam-associated information may refer to whether a corresponding configuration (e.g., CSI-RS resource) uses the same spatial domain filter as other configuration (e.g., another CSI-RS resource within the same CSI-RS resource set) or uses a different spatial domain filter, or with which reference signal is QCL, or if QCLed, what type (e.g., QCL type A, B, C, or D) it has.

According to the related art, in a communication system with a relatively large cell radius of a base station, each base station was installed so that the respective base station includes functions of a digital processing unit (or distributed unit (DU)) and a radio frequency (RF) processing unit (or radio unit (RU)). However, as high-frequency bands are used in 4th generation (4G) systems and/or its subsequent communication systems (e.g., fifth-generation (5G), and the cell coverage of a base station decreased, the number of base stations to cover a certain area has increased. Thus, it led to more increased burden of initial installation costs for communication providers to install more base stations. In order to reduce the installation costs of the base station, a structure has been proposed in which the DU and the RU of the base station are separated so that one or more RUs are connected to one DU through a wired network and one or more RUs geographically distributed are arranged to cover a specific area.

For example, a method of a base station comprises: configuring different time intervals and multiple phase shifts across an antenna array of the base station, receiving a signal from at least one User Equipment (UE) at the different time intervals and the multiple phase shifts across the antenna array, identifying phase angles of the signal received at the different time intervals and the multiple phase shifts, and identifying an angle of arrival (AoA) of the signal received from the at least one UE based on the phase angles of the signal received at the different time intervals and the multiple phase shifts.

For example, the receiving the signal from the at least one UE at the different time intervals and the multiple phase shifts across the antenna array of the base station, comprises: receiving the signal from the at least one UE at a first-time interval without applying unit shift across the antenna array, receiving the signal from the at least one UE at a second time interval by applying a one unit shift across the antenna array, and receiving the signal from the at least one UE at a third time interval by applying a two unit shift across the antenna array.

For example, the identifying the phase angles of the signal received at the different time intervals and the multiple phase shifts, comprises: identifying a first phase angle in the phase angles of the signal during reception of the signal at the first time interval without applying unit shift across the antenna array, identifying a second phase angle in the phase angles of the signal during reception of the signal at the second time interval by applying a unit shift across the antenna array, and identifying a third phase angle in the phase angles of the signal during reception of the signal at the third time interval by applying a multiple unit shift across the antenna array.

For example, the identifying the AoA of the signal received from the at least one UE based on the phase angles of the signal received at the different time intervals and the multiple phase shifts comprises: identifying a difference between the phase angles of the signal received at the different time intervals and the multiple phase shifts, and identifying the AoA of the signal received from the at least one UE based on the difference between the phase angles.

For example, the receiving the signal from the at least one UE comprises receiving, based on a wide beam, the signal from the at least one UE.

For example, the method comprises: identifying a narrow beam overlapping on the identified AoA for data communication with the UE.

For example, the identifying the phase angles of the signal received at the different time intervals and the multiple phase shifts, comprises: identifying a first total amplitude of signals received from multiple UEs without applying a unit shift across the antenna array, identifying a second total amplitude of signals received from the multiple UEs by applying a one unit shift across the antenna array, and identifying whether the first total amplitude is equal to the second total amplitude.

For example, the method further comprises identifying the phase angles of the signal received from each UE at the different time intervals and the multiple phase shifts, when the first total amplitude is equal to the second total amplitude.

For example, the method further comprises identifying the phase angles of the signal received from each UE at the different time intervals and the multiple phase shifts on the received signals, when the first total amplitude is unequal to the second total amplitude.

For example, a base station comprises: a memory, and at least one processor, coupled to the memory.

For example, the at least one processor is configured to: configure different time intervals and multiple phase shifts across an antenna array of the base station, receive a signal from at least one User Equipment (UE) at the different time intervals and the multiple phase shifts across the antenna array, identify phase angles of the signal received at the different time intervals and the multiple phase shifts, and identify an angle of arrival (AoA) of the signal received from the at least one UE based on the phase angles of the signal received at the different time intervals and the multiple phase shifts.

For example, the at least one processor is configured to: receive the signal from the at least one UE at a first-time interval without applying unit shift across the antenna array, receive the signal from the at least one UE at a second time interval by applying a one unit shift across the antenna array, and receive the signal from the at least one UE at a third time interval by applying a two unit shift across the antenna array.

For example, the at least one processor is configured to: identify a first phase angle in the phase angles of the signal during reception of the signal at the first time interval without applying unit shift across the antenna array, identify a second phase angle in the phase angles of the signal during reception of the signal at the second time interval by applying a unit shift across the antenna array, identify a third phase angle in the phase angles of the signal during reception of the signal at the third time interval by applying a multiple unit shift across the antenna array.

For example, the at least one processor is configured to: identify a difference between the phase angles of the signal received at the different time intervals and the multiple phase shifts, and identify the AoA of the signal received from the at least one UE based on the difference between the phase angles.

For example, the receiving the signal from the at least one UE comprises receiving, based on a wide beam, the signal from the at least one UE.

For example, the at least one processor is configured to: identify a narrow beam overlapping on the identified AoA for data communication with the UE.

For example, the at least one processor is configured to: identify a first total amplitude of signals received from multiple UEs without applying a unit shift across the antenna array, identify a second total amplitude of signals received from the multiple UEs by applying a one unit shift across the antenna array, and identify whether the first total amplitude is equal to the second total amplitude.

For example, the at least one processor is configured to: identify the phase angles of the signal received from each UE at the different time intervals and the multiple phase shifts, when the first total amplitude is equal to the second total amplitude.

For example, the at least one processor is configured to: identify the phase angles of the signal received from each UE at the different time intervals and the multiple phase shifts on the received signals, when the first total amplitude is unequal to the second total amplitude.

For example, a method for determining an Angle of Arrival (AoA) of a signal by a base station, comprises: configuring, by the base station, different time intervals and multiple phase shifts across an antenna array of the base station, receiving, by the base station, the signal from at least one User Equipment (UE) at the different time intervals and the multiple phase shifts across the antenna array, estimating, by the base station, phase angles of the signal received at the different time intervals and the multiple phase shifts, and determining the AoA of the signal received from the at least one UE based on the phase angles of the signal received at the different time intervals and the multiple phase shifts.

For example, the receiving, by the base station, the signal from the at least one UE at the different time intervals and the multiple phase shifts across the antenna array of the base station, comprises: receiving, by the base station, the signal from the at least one UE at a first-time interval without applying unit shift across the antenna array, receiving, by the base station, the signal from the at least one UE at a second time interval by applying a one unit shift across the antenna array, and receiving, by the base station, the signal from the at least one UE at a third time interval by applying a two unit shift across the antenna array.

For example, the estimating, by the base station, the phase angles of the signal received at the different time intervals and the multiple phase shifts, comprises: estimating, by the base station, a first phase angle in the phase angles of the signal during reception of the signal at the first time interval without applying unit shift across the antenna array, estimating, by the base station, a second phase angle in the phase angles of the signal during reception of the signal at the second time interval by applying a unit shift across the antenna array, estimating, by the base station, a third phase angle in the phase angles of the signal during reception of the signal at the third time interval by applying a multiple unit shift across the antenna array.

For example, the determining, by the base station, the AoA of the signal received from the at least one UE based on the phase angles of the signal received at the different time intervals and the multiple phase shifts comprises: determining, by the base station, a difference between the phase angles of the signal received at the different time intervals and the multiple phase shifts, and estimating, by the base station, the AoA of the signal received from the at least one UE based on the difference between the phase angles.

For example, the base station uses a wide beam for receiving the signal from the at least one UE.

For example, the method comprises: identifying, by the base station, a narrow beam overlapping on the determined AoA for data communication with the UE.

For example, the estimating, by the base station, the phase angles of the signal received at the different time intervals and the multiple phase shifts, comprises: estimating, by the base station, a first total amplitude of signals received from multiple UEs without applying a unit shift across the antenna array, estimating, by the base station, a second total amplitude of signals received from the multiple UEs by applying a one unit shift across the antenna array, determining, by the base station, whether the first total amplitude is equal to the second total amplitude, and performing, by the base station, at least one of: estimating the phase angles of the signal received from each UE at the different time intervals and the multiple phase shifts, when the first total amplitude is equal to the second total amplitude, and determining the phase angles of the signal received from each UE at the different time intervals and the multiple phase shifts on the received signals, when the first total amplitude is unequal to the second total amplitude.

For example, A base station for determining an Angle of Arrival (AoA) of a signal, comprises: a memory, and an AoA estimating engine comprising processing circuitry, coupled to the memory.

For example, the AoA estimating engine is configured for: configuring different time intervals and multiple phase shifts across an antenna array of the base station, receiving the signal from at least one User Equipment (UE) at the different time intervals and the multiple phase shifts across the antenna array, estimating phase angles of the signal received at the different time intervals and the multiple phase shifts, and determining the AoA of the signal received from the at least one UE based on the phase angles of the signal received at the different time intervals and the multiple phase shifts.

For example, the AoA estimating engine uses a wide beam for receiving the signal from the at least one UE.

For example, the AoA estimating engine is configured for: identifying a narrow beam overlapping on the determined AoA for data communication with the UE.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of a base station, wherein the method comprises:
    configuring different time intervals and multiple phase shifts across an antenna array of the base station;
    receiving, based on a wide beam, a signal from at least one User Equipment (UE) at the different time intervals and the multiple phase shifts across the antenna array;

identifying phase angles of the signal received at the different time intervals and the multiple phase shifts; and identifying an angle of arrival (AoA) of the signal received from the at least one UE based on the phase angles of the signal received at the different time intervals and the multiple phase shifts.

2. The method of claim 1, wherein the receiving the signal from the at least one UE at the different time intervals and the multiple phase shifts across the antenna array of the base station, comprises:

receiving the signal from the at least one UE at a first-time interval without applying unit shift across the antenna array;

receiving the signal from the at least one UE at a second time interval by applying a one unit shift across the antenna array; and receiving the signal from the at least one UE at a third time interval by applying a two unit shift across the antenna array.

3. The method of claim 1, wherein the identifying the phase angles of the signal received at the different time intervals and the multiple phase shifts, comprises:

identifying a first phase angle in the phase angles of the signal during reception of the signal at the first time interval without applying unit shift across the antenna array;

identifying a second phase angle in the phase angles of the signal during reception of the signal at the second time interval by applying a unit shift across the antenna array; and identifying a third phase angle in the phase angles of the signal during reception of the signal at the third time interval by applying a multiple unit shift across the antenna array.

4. The method of claim 1, wherein the identifying the Ao A of the signal received from the at least one UE based on the phase angles of the signal received at the different time intervals and the multiple phase shifts comprises:

identifying a difference between the phase angles of the signal received at the different time intervals and the multiple phase shifts; and identifying the AoA of the signal received from the at least one UE based on the difference between the phase angles.

5. The method of claim 1, wherein the method comprises:
identifying a narrow beam overlapping on the identified AoA for data communication with the UE.

6. The method of claim 1, wherein the identifying the phase angles of the signal received at the different time intervals and the multiple phase shifts, comprises:

identifying a first total amplitude of signals received from multiple UEs without applying a unit shift across the antenna array;

identifying a second total amplitude of signals received from the multiple UEs by applying a one unit shift across the antenna array; and identifying whether the first total amplitude is equal to the second total amplitude.

7. The method of claim 6, wherein the method further comprises:

identifying the phase angles of the signal received from each UE at the different time intervals and the multiple phase shifts, when the first total amplitude is equal to the second total amplitude.

8. The method of claim 7, wherein the method further comprises:

identifying the phase angles of the signal received from each UE at the different time intervals and the multiple phase shifts on the received signals, when the first total amplitude is unequal to the second total amplitude.

9. A base station comprising:
a memory; and
at least one processor, coupled to the memory, wherein the at least one processor is configured to:

configuring different time intervals and multiple phase shifts across an antenna array of the base station, receive, based on a wide beam, a signal from at least one User Equipment (UE) at the different time intervals and the multiple phase shifts across the antenna array, identify phase angles of the signal received at the different time intervals and the multiple phase shifts, and identify an angle of arrival (AoA) of the signal received from the at least one UE based on the phase angles of the signal received at the different time intervals and the multiple phase shifts.

10. The base station of claim 9, wherein the at least one processor is configured to:

receive the signal from the at least one UE at a first-time interval without applying unit shift across the antenna array;

receive the signal from the at least one UE at a second time interval by applying a one unit shift across the antenna array; and receive the signal from the at least one UE at a third time interval by applying a two unit shift across the antenna array.

11. The base station of claim 9, wherein the at least one processor is configured to:

identify a first phase angle in the phase angles of the signal during reception of the signal at the first time interval without applying unit shift across the antenna array;

identify a second phase angle in the phase angles of the signal during reception of the signal at the second time interval by applying a unit shift across the antenna array;

identify a third phase angle in the phase angles of the signal during reception of the signal at the third time interval by applying a multiple unit shift across the antenna array.

12. The base station of claim 9, wherein the at least one processor is configured to:

identify a difference between the phase angles of the signal received at the different time intervals and the multiple phase shifts; and identify the AoA of the signal received from the at least one UE based on the difference between the phase angles.

13. The base station of claim 9, wherein the at least one processor is configured to:

identify a narrow beam overlapping on the identified AoA for data communication with the UE.

14. The base station of claim 9, wherein the at least one processor is configured to:

identify a first total amplitude of signals received from multiple UEs without applying a unit shift across the antenna array;

identify a second total amplitude of signals received from the multiple UEs by applying a one unit shift across the antenna array; and identify whether the first total amplitude is equal to the second total amplitude.

15. The base station of claim 14, wherein the at least one processor is configured to:
    identify the phase angles of the signal received from each UE at the different time intervals and the multiple phase shifts, when the first total amplitude is equal to the second total amplitude.

16. The base station of claim 15, wherein the at least one processor is configured to:
    identify the phase angles of the signal received from each UE at the different time intervals and the multiple phase shifts on the received signals, when the first total amplitude is unequal to the second total amplitude.

* * * * *